(12) United States Patent
Wada et al.

(10) Patent No.: US 12,399,730 B2
(45) Date of Patent: Aug. 26, 2025

(54) SCALING SYSTEM AND CALCULATION METHOD

(71) Applicant: Hitachi, Ltd., Tokyo (JP)

(72) Inventors: Kiyomi Wada, Tokyo (JP); Shinichi Hayashi, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 709 days.

(21) Appl. No.: 17/469,605

(22) Filed: Sep. 8, 2021

(65) Prior Publication Data
US 2022/0156101 A1 May 19, 2022

(30) Foreign Application Priority Data

Nov. 13, 2020 (JP) .................... 2020-189197

(51) Int. Cl.
*G06F 9/455* (2018.01)
*G06F 9/355* (2018.01)

(52) U.S. Cl.
CPC ........ *G06F 9/45558* (2013.01); *G06F 9/3555* (2013.01); *G06F 2009/4557* (2013.01); *G06F 2009/45575* (2013.01)

(58) Field of Classification Search
CPC ... G06F 2009/4557; G06F 2009/45575; G06F 9/5077
See application file for complete search history.

(56) References Cited

U.S. PATENT DOCUMENTS

| | | | |
|---|---|---|---|
| 10,963,189 B1* | 3/2021 | Neelakantam | ........ H04L 67/566 |
| 11,734,038 B1* | 8/2023 | Tsai | ...................... G06F 11/203 |
| | | | 714/19 |
| 2011/0138384 A1* | 6/2011 | Bozek | ................. H04L 43/0882 |
| | | | 718/1 |
| 2015/0236724 A1* | 8/2015 | Reinart | ............. H03M 13/3761 |
| | | | 714/774 |
| 2016/0179860 A1* | 6/2016 | Erdogan | ............. G06F 16/2282 |
| | | | 707/738 |

(Continued)

FOREIGN PATENT DOCUMENTS

JP 2015-504218 A 2/2015

OTHER PUBLICATIONS

Extended European Search Report dated Mar. 1, 2022 for European Patent Application No. 21196183.4.

*Primary Examiner* — Dong U Kim
(74) *Attorney, Agent, or Firm* — Volpe Koenig

(57) ABSTRACT

A scaling system ranges over a first base in which a first calculating apparatus having first and second worker nodes operates, and a second base in which a storage apparatus connected to the first base by a network is set. The storage apparatus includes first and second network ports, and first and second volumes accessed by first and second worker node, respectively. A second calculating apparatus is further set in the first base, and the second worker node is moved to the second calculating apparatus and operates as a third worker node and the second volume communicates with the third worker node through the second network port if the transfer rate of the first calculating apparatus or the transfer rate of the first network port exceeds a predetermined threshold when the first and second volumes are in communication with the first calculating apparatus through the first network port.

10 Claims, 18 Drawing Sheets

(56) References Cited

U.S. PATENT DOCUMENTS

2017/0093678 A1\* 3/2017 Gnanasekaran ........ H04L 43/12
2017/0257429 A1\* 9/2017 Hosie .................... H04L 67/101
2019/0073288 A1\* 3/2019 Hayashi .............. H04L 67/1097

\* cited by examiner

FIG. 5

318 — SYSTEM CONFIGURATION INFORMATION

601 — SYSTEM TABLE
- 607 — DATE AND TIME
- 608 — SYSTEM NAME
- 609 — RDB SERVER NAME

602 — RDB SERVER TABLE
- 610 — DATE AND TIME
- 611 — SYSTEM NAME
- 612 — RDB SERVER NAME
- 613 — RDB SERVER TYPE
- 614 — RDB INSTANCE ID
- 615 — IP ADDRESS OF RDB
- 616 — STORAGE PORT NAME

603 — RDB NODE CONFIGURATION TABLE
- 617 — DATE AND TIME
- 618 — RDB SERVER NAME
- 619 — NODE NAME
- 620 — NODE TYPE

604 — NODE TABLE
- 621 — DATE AND TIME
- 622 — RDB SERVER NAME
- 623 — NODE NAME
- 624 — NODE TYPE
- 625 — IP ADDRESS OF NODE
- 626 — PATH OF NODE
- 627 — PORT NUMBER OF NODE

605 — LDEV TABLE
- 628 — DATE AND TIME
- 629 — NODE NAME
- 630 — PATH OF DEVICE
- 631 — LDEV ID
- 632 — LDEV NAME
- 633 — STORAGE PORT NAME
- 634 — LUN ID

606 — SYSTEM CONFIGURATION TABLE
- 635 — DATE AND TIME
- 636 — SYSTEM NAME
- 637 — RDB SERVER NAME
- 638 — NODE NAME
- 639 — LDEV名
- 640 — STORAGE PORT NAME

SYSTEM PERFORMANCE INFORMATION

701 — SERVER PERFORMANCE TABLE
- 708 — DATE AND TIME
- 709 — RDB SERVER NAME
- 710 — CPU USAGE
- 711 — NETWORK USAGE
- 712 — DISK TRANSFER RATE
- 713 — DISK IOPS

702 — STORAGE PORT PERFORMANCE TABLE
- 714 — DATE AND TIME
- 715 — STORAGE NAME
- 716 — STORAGE PORT NAME
- 717 — TRANSFER RATE OF STORAGE PORT
- 718 — IOPS OF STORAGE PORT
- 719 — RESPONSE TIME OF STORAGE PORT

703 — SYSTEM PERFORMANCE TABLE
- 720 — DATE AND TIME
- 721 — SYSTEM NAME
- 722 — CPU USAGE OF RDB SERVER
- 723 — NETWORK USAGE OF RDB SERVER
- 724 — DISK IOPS OF RDB SERVER
- 725 — DISK TRANSFER RATE OF RDB SERVER
- 726 — IOPS OF STORAGE PORT
- 727 — TRANSFER RATE OF STORAGE PORT
- 728 — RESPONSE TIME OF STORAGE PORT

704 — SERVER DEVICE PERFORMANCE TABLE
- 729 — DATE AND TIME
- 730 — RDB SERVER NAME
- 731 — PATH OF DEVICE
- 732 — TRANSFER RATE OF DEVICE
- 733 — IOPS OF DEVICE

705 — STORAGE LDEV PERFORMANCE TABLE
- 734 — DATE AND TIME
- 735 — STORAGE NAME
- 736 — LDEV ID
- 737 — TRANSFER RATE OF LDEV
- 738 — IOPS OF LDEV
- 739 — RESPONSE TIME OF LDEV

706 — NODE PERFORMANCE TABLE
- 740 — DATE AND TIME
- 741 — SYSTEM NAME
- 742 — RDB SERVER NAME
- 743 — NODE NAME
- 744 — PATH OF DEVICE
- 745 — IOPS OF DEVICE
- 746 — TRANSFER RATE OF DEVICE
- 747 — TRANSFER RATE OF LDEV
- 748 — IOPS OF LDEV
- 749 — RESPONSE TIME OF LDEV

FIG. 7

SYSTEM MONITORING INFORMATION

801 — SERVER PERFORMANCE THRESHOLD TABLE
- 806 — THRESHOLD OF CPU USAGE
- 807 — THRESHOLD OF NETWORK USAGE
- 808 — THRESHOLD OF DISK TRANSFER RATE
- 809 — THRESHOLD OF DISK IOPS
- 810 — THRESHOLD OF TRANSFER RATE OF DEVICE
- 811 — THRESHOLD OF IOPS OF DEVICE

802 — STORAGE PERFORMANCE THRESHOLD TABLE
- 812 — THRESHOLD OF TRANSFER RATE OF PORT
- 813 — THRESHOLD OF IOPS OF PORT
- 814 — THRESHOLD OF TRANSFER RATE OF LDEV
- 815 — THRESHOLD OF IOPS OF LDEV

803 — ALERT NOTIFICATION TABLE
- 816 — DATE AND TIME
- 817 — ALERT TYPE
- 818 — SYSTEM NAME
- 819 — SUBJECT
- 820 — METRIC TYPE
- 821 — ABNORMAL VALUE

804 — SYSTEM MONITORING RESULT TABLE
- 822 — DATE AND TIME
- 823 — SYSTEM NAME
- 824 — THRESHOLD DETERMINATION RESULT OF CPU USAGE OF RDB SERVER
- 825 — THRESHOLD DETERMINATION RESULT OF NETWORK USAGE OF RDB SERVER
- 826 — THRESHOLD DETERMINATION RESULT OF DISK IOPS OF RDB SERVER
- 827 — THRESHOLD DETERMINATION RESULT OF DISK TRANSFER RATE OF RDB SERVER
- 828 — THRESHOLD DETERMINATION RESULT OF IOPS OF STORAGE PORT
- 829 — THRESHOLD DETERMINATION RESULT OF TRANSFER RATE OF STORAGE PORT

805 — NODE MONITORING RESULT TABLE
- 830 — DATE AND TIME
- 831 — SYSTEM NAME
- 832 — RDB SERVER NAME
- 833 — NODE NAME
- 834 — PATH OF DEVICE
- 835 — THRESHOLD DETERMINATION RESULT OF IOPS OF DEVICE
- 836 — THRESHOLD DETERMINATION RESULT OF TRANSFER RATE OF DEVICE
- 837 — THRESHOLD DETERMINATION RESULT OF TRANSFER RATE OF LDEV
- 838 — THRESHOLD DETERMINATION RESULT OF IOPS OF LDEV

SCALING EXECUTION INFORMATION

321

901 — RDB SCALING DETERMINATION RESULT TABLE
- 907 — DATE AND TIME
- 908 — SYSTEM NAME
- 909 — RDB SERVER NAME
- 910 — SERVER TYPE
- 911 — SCALING NECESSITY DETERMINATION

902 — RDB SCALE-UP EXECUTION TABLE
- 912 — TASK TYPE
- 913 — SYSTEM NAME
- 914 — RDB SERVER NAME
- 915 — SERVER TYPE
- 916 — SCALE-UP SERVER TYPE
- 917 — SCRIPT PROGRAM

903 — RDB SCALE-UP RESULT TABLE
- 918 — SYSTEM NAME
- 919 — RDB SERVER NAME
- 920 — BEFORE-SCALE-UP SERVER TYPE
- 921 — AFTER-SCALE-UP SERVER TYPE

904 — NODE MOVEMENT DETERMINATION RESULT TABLE
- 922 — DATE AND TIME
- 923 — SYSTEM NAME
- 924 — RDB SERVER NAME
- 925 — NODE NAME
- 926 — LDEV NAME
- 927 — STORAGE PORT NAME
- 928 — SCALING NECESSITY DETERMINATION
- 929 — MOVEMENT NECESSITY DETERMINATION

905 — RDB SCALE-OUT EXECUTION TABLE
- 930 — TASK TYPE
- 931 — RDB (coordinator) SERVER NAME
- 932 — RDB (worker) SERVER NAME
- 933 — SERVER TYPE
- 934 — THE NUMBER OF workers
- 935 — worker NODE NAME (START NUMBER)
- 936 — SCRIPT PROGRAM 906 — SCALE-OUT RESULT TABLE
- 937 — BEFORE-MOVEMENT RDB SERVER NAME
- 938 — AFTER-MOVEMENT RDB SERVER NAME
- 939 — BEFORE-MOVEMENT NODE NAME
- 940 — AFTER-MOVEMENT NODE NAME
- 941 — BEFORE-MOVEMENT STORAGE PORT NAME
- 942 — AFTER-MOVEMENT STORAGE PORT NAME
- 943 — LDEV ID
- 944 — LDEV NAME

1001 — TASK EXECUTION MANAGEMENT TABLE
- 1006 — TASK ID
- 1007 — STATE
- 1008 — TASK TYPE
- 1009 — REGISTRATION DATE AND TIME
- 1010 — START DATE AND TIME
- 1011 — END DATE AND TIME

TASK EXECUTION INFORMATION

1002 — SINGLE SERVER DEPLOYMENT TABLE
- 1012 — TASK TYPE
- 1013 — RDB SERVER NAME
- 1014 — SERVER TYPE
- 1015 — THE NUMBER OF workers
- 1016 — SCRIPT PROGRAM

1003 — MULTI-SERVER DEPLOYMENT TABLE
- 1017 — TASK TYPE
- 1018 — RDB (coordinator) SERVER NAME
- 1019 — RDB (coordinator) SERVER TYPE
- 1020 — RDB (worker) SERVER NAME (START NUMBER)
- 1021 — RDB (worker) SERVER TYPE
- 1022 — THE NUMBER OF workers
- 1023 — SCRIPT PROGRAM

1004 — LDEV CREATION TABLE
- 1024 — TASK TYPE
- 1025 — LDEV ID (START NUMBER)
- 1026 — LDEV NAME (START NUMBER)
- 1027 — LDEV SIZE
- 1028 — THE NUMBER OF VOLUMES
- 1029 — SCRIPT PROGRAM

1005 — LDEV ASSOCIATION TABLE
- 1030 — TASK TYPE
- 1031 — RDB SERVER NAME
- 1032 — NODE NAME
- 1033 — LDEV ID
- 1034 — LDEV NAME
- 1035 — STORAGE PORT NAME
- 1036 — SCRIPT PROGRAM

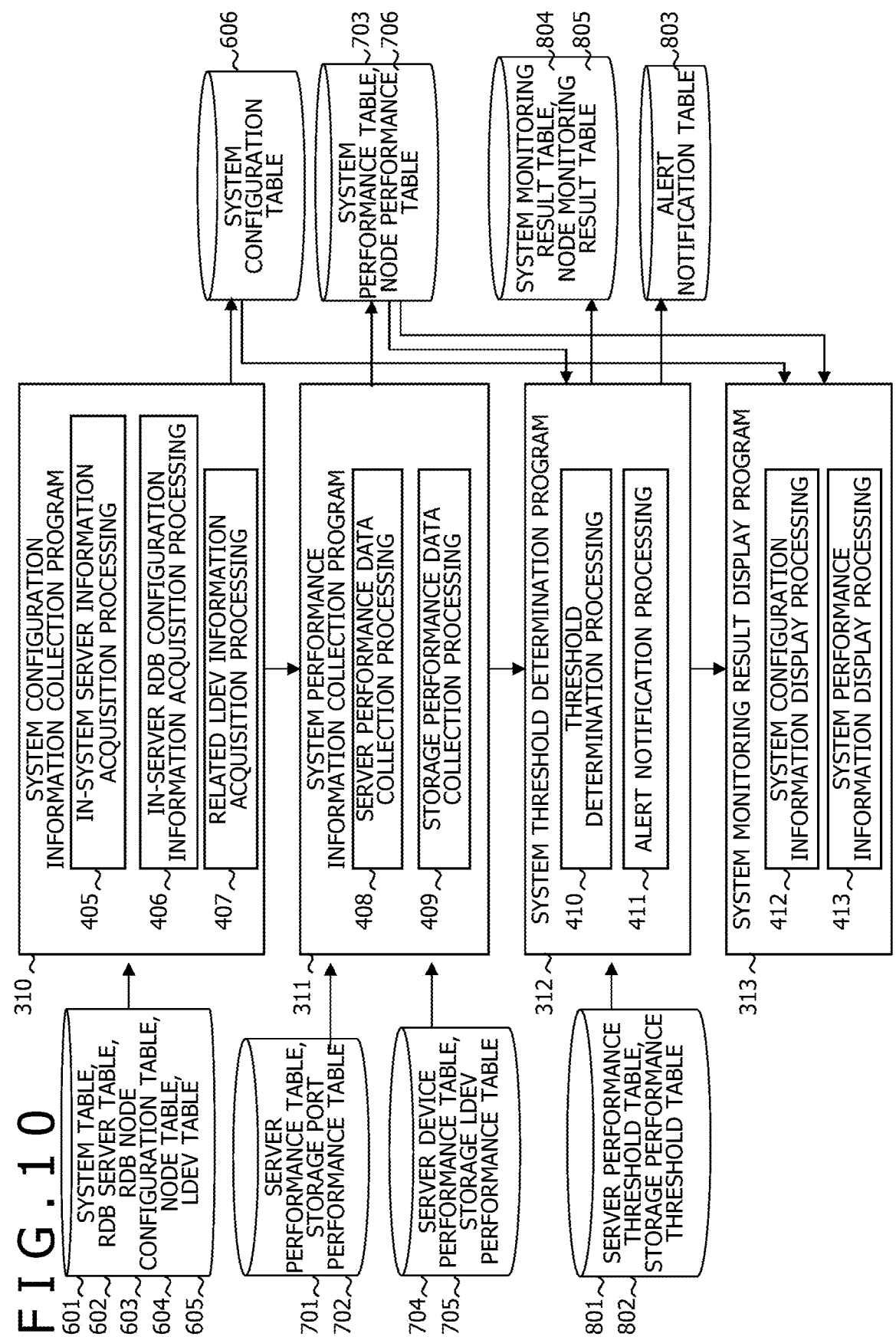

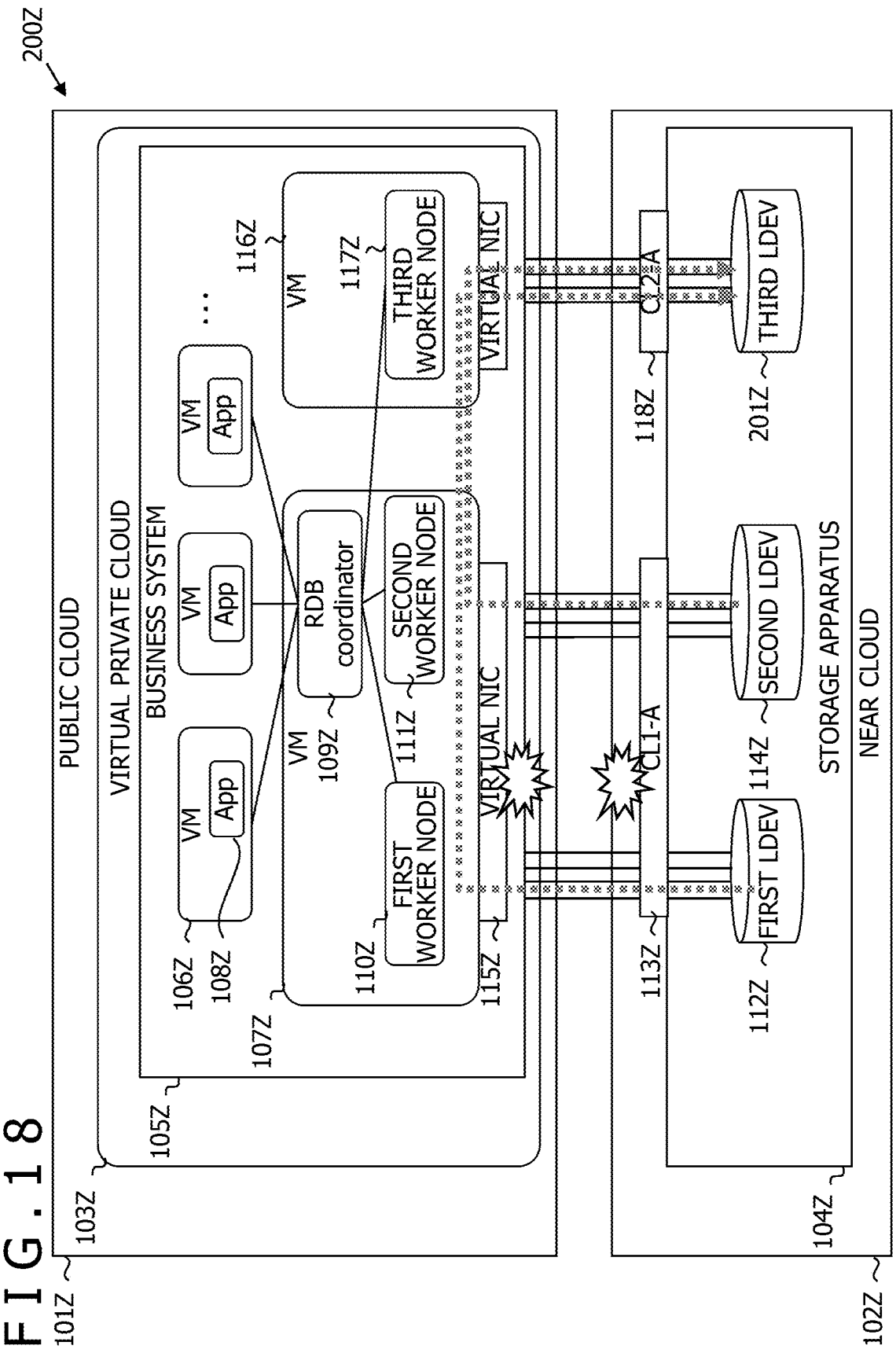

SCALING SYSTEM AND CALCULATION METHOD

BACKGROUND OF THE INVENTION

1. Field of the Invention

The present invention relates to a scaling system and a calculation method.

2. Description of the Related Art

A cloud bursting technique is known in which calculation resources of a public cloud are temporarily used in response to a sudden increase in the traffic in monthly processing or the like. The workload for which the cloud bursting is required is unsteady and therefore preliminary design is difficult. JP-2015-504218-T (hereinafter, patent document 1), a system including a master node and plural worker nodes controlled by the master node is disclosed. In this system, each worker node stores 25 or more module-system blocks of a distributed database and each module-system block has a size of 5 Gbytes or larger and has an associated log file.

SUMMARY OF THE INVENTION

In the invention described in patent document 1, it takes a long time to start cloud bursting processing.

A scaling system according to a first aspect of the present invention is a scaling system including a first base in which first calculating apparatus in which a first worker node and a second worker node operate is set and a second base in which storage apparatus connected to the first base by a network is set. The scaling system is configured to range over the first base and the second base. The storage apparatus includes a first network port and a second network port. The storage apparatus includes a first volume accessed by the first worker node and a second volume accessed by the second worker node. Second calculating apparatus is further set in the first base. The second worker node is moved to the second calculating apparatus and is caused to operate as a third worker node and the second volume is caused to communicate with the third worker node through the second network port if the transfer rate of the first calculating apparatus or the transfer rate of the first network port exceeds a predetermined threshold when the first volume and the second volume are executing communication with the first calculating apparatus through the first network port.

A calculation method according to a second aspect of the present invention is a calculation method executed by a computer included in a scaling system configured to range over a first base in which first calculating apparatus in which a first worker node and a second worker node operate is set and a second base in which storage apparatus connected to the first base by a network is set. The storage apparatus includes a first network port and a second network port. The storage apparatus includes a first volume accessed by the first worker node and a second volume accessed by the second worker node. Second calculating apparatus is further set in the first base. The calculation method includes moving the second worker node to the second calculating apparatus to cause the second worker node to operate as a third worker node and causing the second volume to communicate with the third worker node through the second network port if the transfer rate of the first calculating apparatus exceeds a predetermined threshold when the first volume and the second volume are executing communication with the first calculating apparatus through the first network port.

According to the present invention, cloud bursting processing can be rapidly started.

BRIEF DESCRIPTION OF THE DRAWINGS

FIG. 5 is a diagram illustrating details of system configuration information;

FIG. 6 is a diagram illustrating details of system performance information;

FIG. 7 is a diagram illustrating details of system monitoring information;

FIG. 8 is a diagram illustrating details of scaling execution information;

FIG. 9 is a diagram illustrating details of task execution information;

FIG. 10 is a diagram illustrating monitoring processing executed by the monitoring server;

FIG. 18 is a diagram illustrating one example of scale-out processing in a configuration of a related art.

DESCRIPTION OF THE PREFERRED EMBODIMENT

First Embodiment

A first embodiment of the scaling system according to the present invention will be described below with reference to FIG. 1 to FIG. 18.

Figure 1:
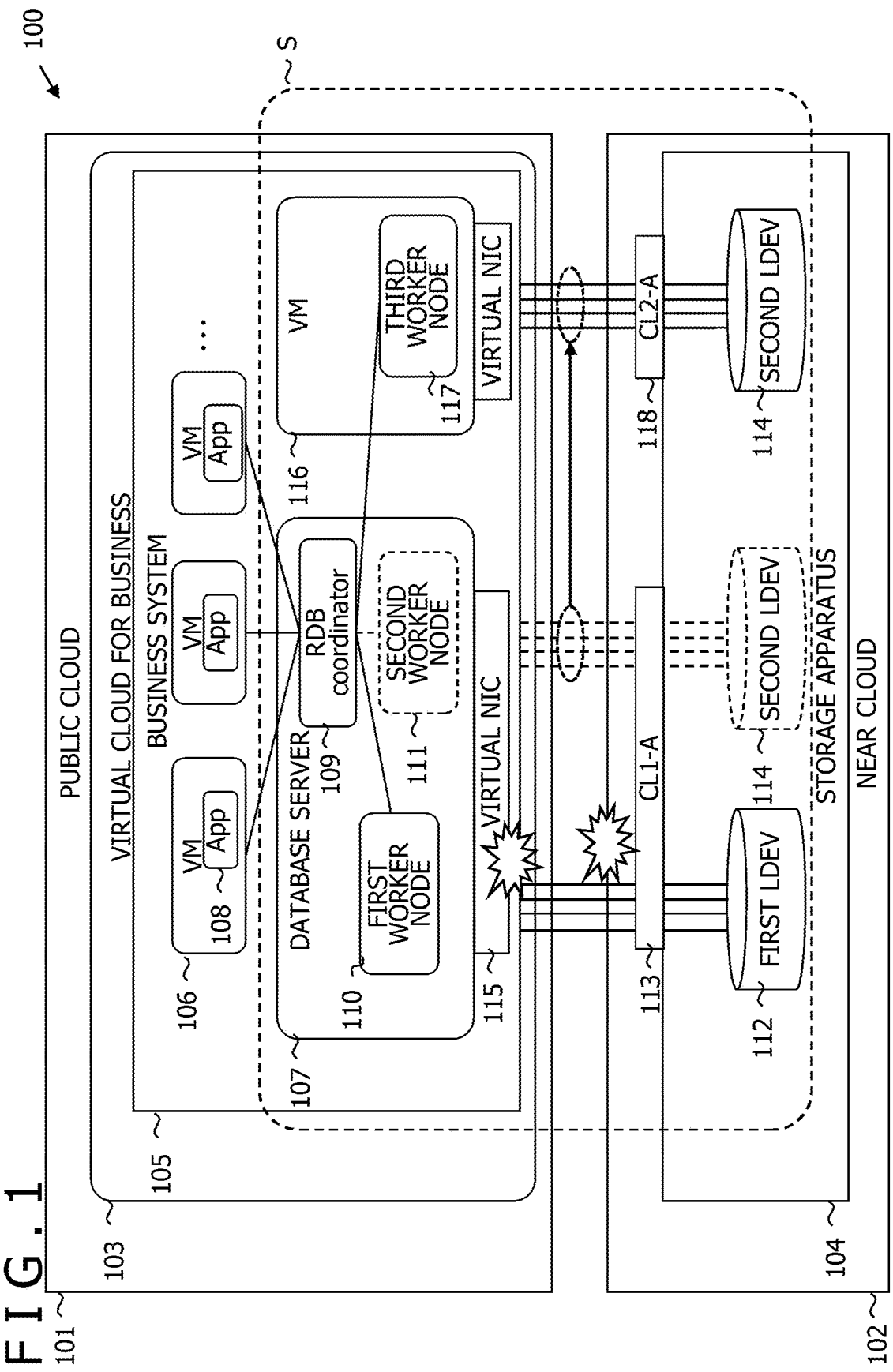
FIG. 1 is an outline diagram of a scaling system.

FIG. 1 is an outline diagram of a scaling system 100. The scaling system 100 is a hybrid cloud configuration that ranges over a public cloud 101 and a near cloud 102 and properly scales out a calculation system S including a database and a storage as described later. A virtual cloud 307 for management and a virtual cloud 103 for business are included in the public cloud 101. The management virtual cloud 307 and the business virtual cloud 103 are both a virtual private cloud. Storage apparatus 104 is included in the near cloud 102. The storage apparatus 104 includes one or more logical devices (LDEV). Hereinafter, the public cloud 101 will be referred to also as "first base" and the near cloud 102 will be referred to also as "second base."

A business system 105 is included in the virtual cloud 103 for business. The business system 105 includes an application server (virtual machine, VM) 106 that is a virtual machine and a database server 107. An application (App) 108 is installed on the application server 106. A distributed relational database (RDB) is installed on the database server 107. This database includes one coordinator node 109, a first worker node 110, and a second worker node 111.

The first worker node 110 and a first LDEV 112 in the storage apparatus 104 are coupled by plural connections via a first storage port 113. Similarly, the second worker node 111 and a second LDEV 114 are coupled by plural connections via the first storage port 113. Hereinafter, a server in which at least either the coordinator nodes or the worker nodes are operating will be referred to as "database server." In the drawing, the first storage port 113 is described as "CL1-A" and a second storage port 118 is described as "CL2-A." Hereinafter, the first worker node 110 will be referred to also as "first calculating apparatus" and the second worker node 111 will be referred to also as "second calculating apparatus."

Here, when either the I/O transfer rate of a virtual NIC 115 of the database server 107 or the transfer rate of the first storage port 113 exceeds a threshold, the following processing is executed in the present embodiment. Specifically, a database server 116 is newly created and a third worker node 117 is created in this database server 116 and is added to the coordinator node 109. The third worker node 117 and the second LDEV 114 are coupled by plural connections via the second storage port 118.

Figure 2:
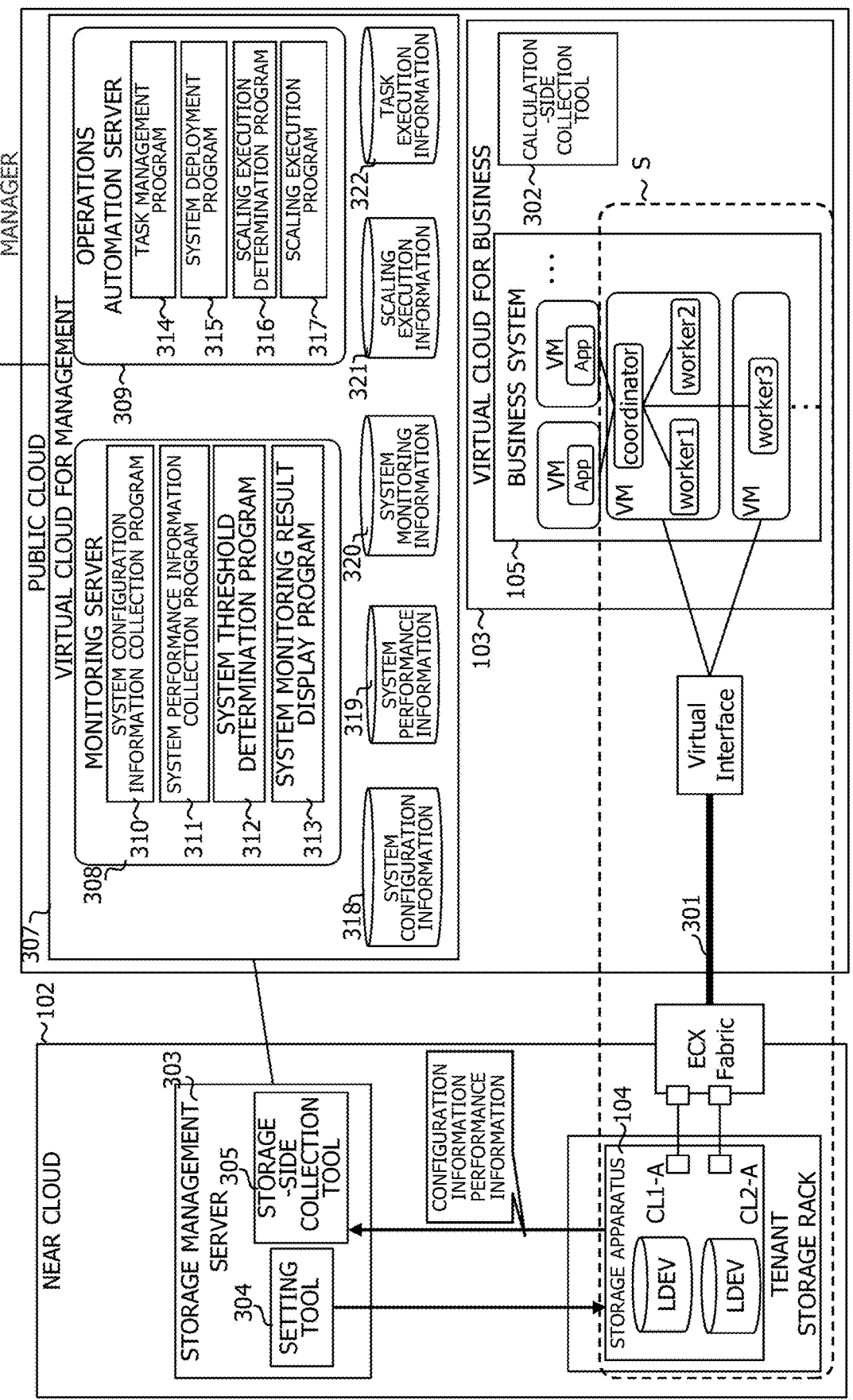
FIG. 2 is an overall configuration diagram of the scaling system.

FIG. 2 is an overall configuration diagram of the scaling system 100. The scaling system 100 includes the public cloud 101 and the near cloud 102 as described above. The public cloud 101 includes the virtual cloud 307 for management and the virtual cloud 103 for business. In the virtual cloud 103 for business, the business system 105 and a calculation-side collection tool 302 that collects configuration information of the system and performance information of the server are included. The business system 105 is connected to the storage apparatus 104 in the near cloud 102 by a dedicated line 301.

The near cloud 102 includes a storage management server 303 and a tenant storage rack 104A including the storage apparatus 104. The storage management server 303 has a setting tool 304 to make settings for the storage apparatus 104 and a storage-side collection tool 305 that collects configuration information and storage performance information of the storage apparatus 104. An operations manager who manages the scaling system 100 accesses the virtual cloud 307 for management in the public cloud 101 by using a client PC 306.

In the virtual cloud 307 for management, a monitoring server 308, an operations automation server 309, system configuration information 318, system performance information 319, system monitoring information 320, scaling execution information 321, and task execution information 322 are included. The monitoring server 308 has a system configuration information collection program 310, a system performance information collection program 311, a system threshold determination program 312, and a system monitoring result display program 313. In the operations automation server 309, a task management program 314, a system deployment program 315, a scaling execution determination program 316, and a scaling execution program 317 are included.

Data used by the monitoring server 308 and the operations automation server 309 are stored in the system configuration information 318, the system performance information 319, the system monitoring information 320, the scaling execution information 321, and the task execution information 322.

Figure 3:
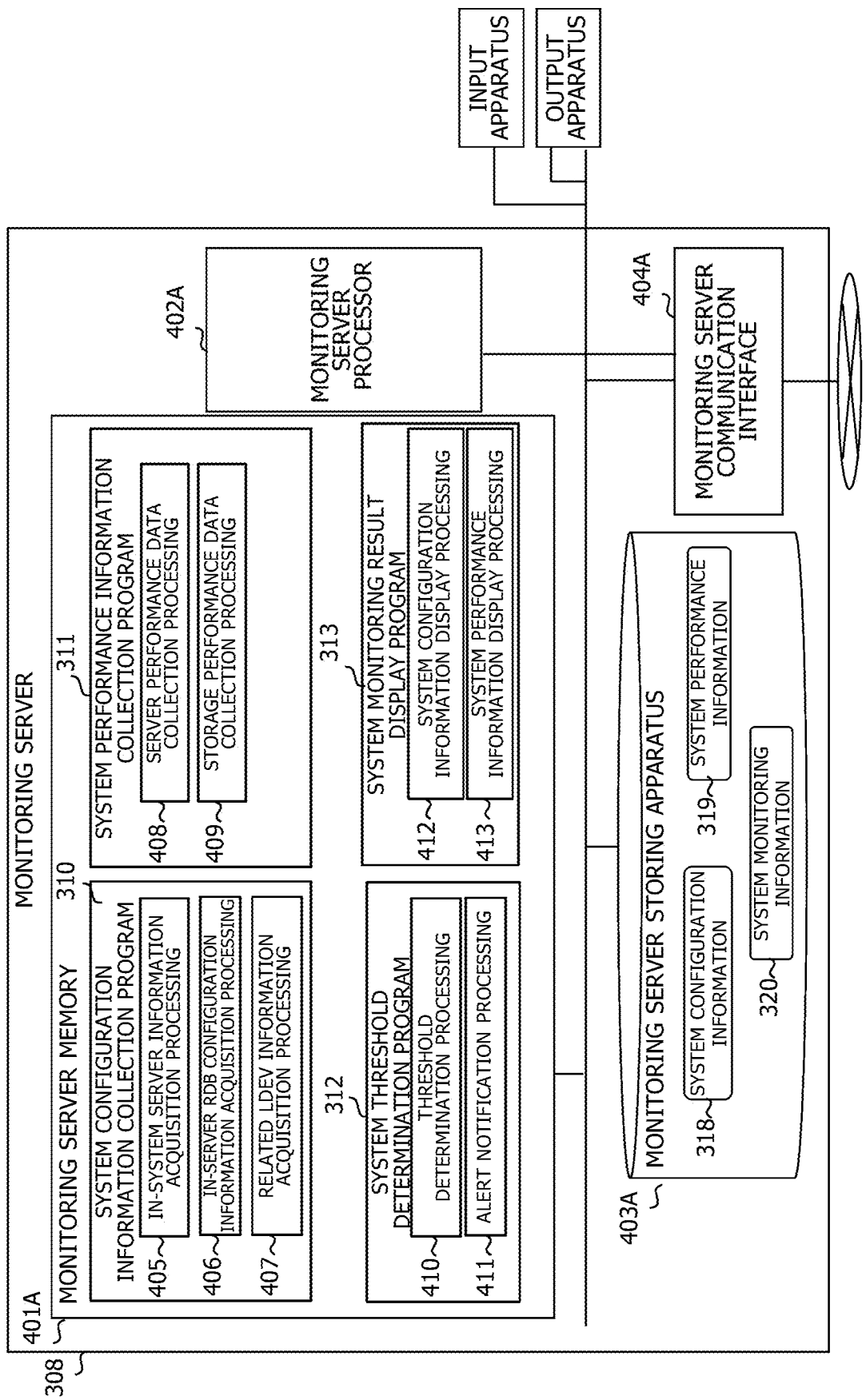
FIG. 3 is a configuration diagram of a monitoring server.

FIG. 3 is a configuration diagram of the monitoring server 308. The monitoring server 308 includes a monitoring server memory 401A that is readable-writable storing apparatus, a monitoring server processor 402A that is a central processing unit, monitoring server storing apparatus 403A that is non-volatile storing apparatus, and a monitoring server communication interface 404A. The monitoring server 308 deploys plural programs stored in the monitoring server storing apparatus 403A or a ROM that is not illustrated in the diagram in an automation server memory 401B and executes the programs. That is, the system configuration information collection program 310, the system performance information collection program 311, the system threshold determination program 312, and the system monitoring result display program 313 are implemented by using the automation server memory 401B, an automation server processor 402B, automation server storing apparatus 403B, and an automation server communication interface 404B.

In the monitoring server storing apparatus 403A, the system configuration information 318, the system performance information 319, and the system monitoring information 320 are stored. Input information from the calculation-side collection tool 302 in the virtual cloud 103 for business and the storage-side collection tool 305 in the storage management server 303 and input-output information exchanged from and to the client PC 306 via a Web browser are input and output to and from the monitoring server communication interface 404A.

In the system configuration information collection program 310, in-system server information acquisition processing 405, in-server RDB configuration information acquisition processing 406, and related LDEV information acquisition processing 407 are included. The in-system server information acquisition processing 405 is processing of acquiring configuration information of all servers included in the scaling system 100, for example, information such as the names of the servers and instance IDs of the servers. The in-server RDB configuration information acquisition processing 406 is processing of acquiring configuration information of the relational database (RDB) included in the virtual cloud 103 for business, for example, information such as IP addresses of worker nodes. The related LDEV information acquisition processing 407 is processing of acquiring information on all logical devices included in the scaling system 100, for example, information such as paths and LDEV IDs of the devices.

In the system performance information collection program 311, server performance data collection processing 408 and storage performance data collection processing 409 are included. The server performance data collection processing 408 is processing of acquiring dynamic performance information of all database servers included in the scaling system 100, for example, information such as the CPU usage and the disk transfer rate. The storage performance data collection processing 409 is processing of acquiring dynamic performance information of all pieces of storage apparatus 104 included in the scaling system 100, for example, information such as the transfer rate of the storage port.

In the system threshold determination program 312, threshold determination processing 410 and alert notification processing 411 are included. The threshold determination processing 410 is processing of executing abnormality sensing by using an evaluation subject value and a threshold and storing the processing result. In the threshold determination processing 410, for example, comparison between a threshold 806 of the CPU usage and a CPU usage 710 to be described later is carried out and the comparison result is stored in a threshold determination result 824 of the CPU usage of the RDB server. The alert notification processing 411 is processing of issuing an alert notification on the basis of the processing result of the threshold determination processing 410.

In the system monitoring result display program 313, system configuration information display processing 412 and system performance information display processing 413 are included. The system configuration information display processing 412 is processing of displaying configuration information of the scaling system 100 on output apparatus, for example, a liquid crystal display. The system performance information display processing 413 is processing of displaying performance information of the scaling system 100 on output apparatus, for example, a liquid crystal display. The output apparatus deemed as the processing subject by the system configuration information display processing 412 and the system performance information display processing 413 may be output apparatus included in the monitoring server 308 or may be output apparatus included in the client PC 306.

Figure 4:
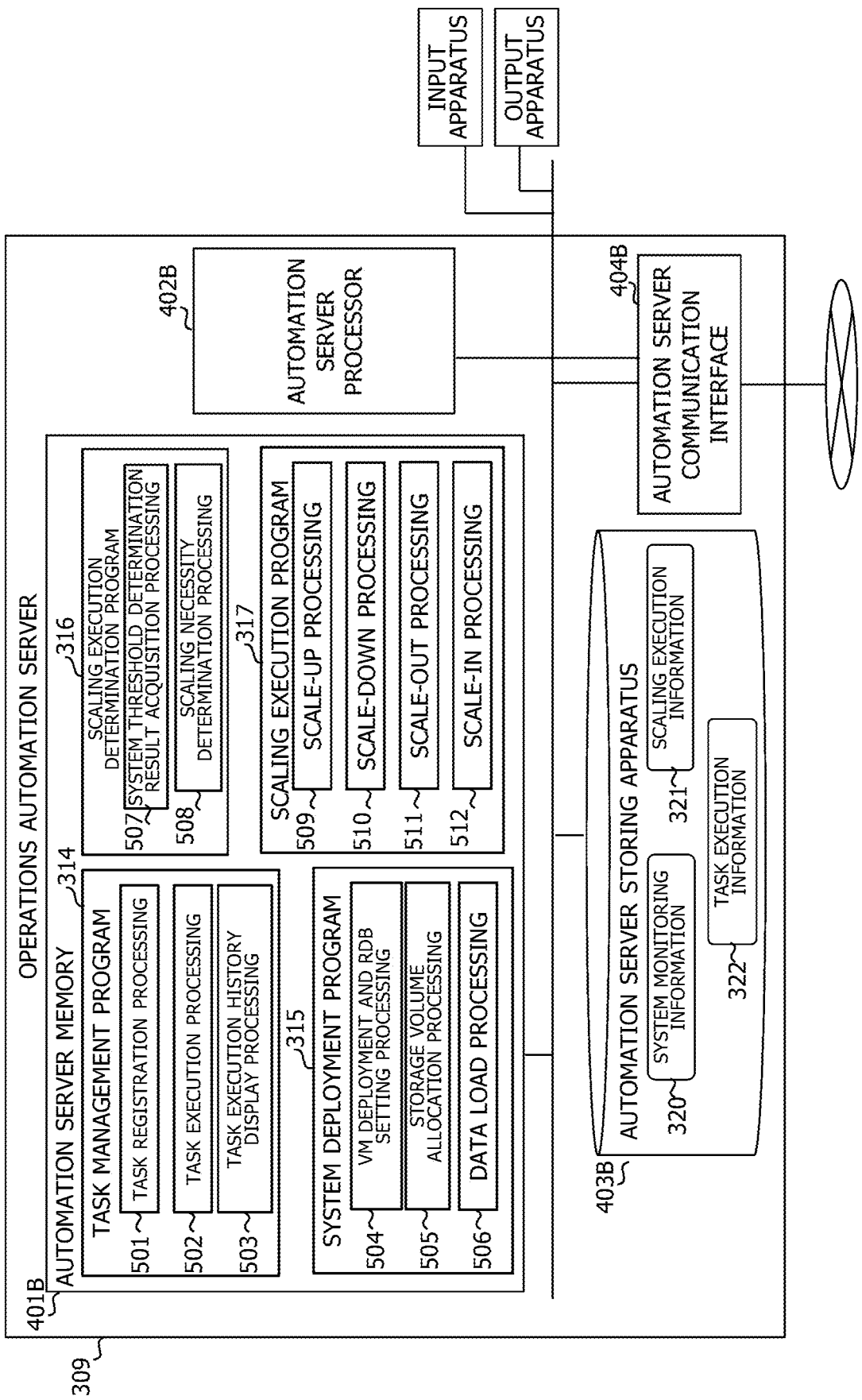
FIG. 4 is a configuration diagram of an operations automation server.

FIG. 4 is a configuration diagram of the operations automation server 309. The operations automation server 309 includes the automation server memory 401B that is readable-writable storing apparatus, the automation server processor 402B that is a central processing unit, the automation server storing apparatus 403B that is non-volatile storing apparatus, and the automation server communication interface 404B. The monitoring server 308 deploys plural programs stored in the monitoring server storing apparatus 403A or a ROM that is not illustrated in the diagram in the automation server memory 401B and executes the programs. That is, the task management program 314, the system deployment program 315, the scaling execution determination program 316, and the scaling execution program 317 are implemented by using the automation server memory 401B, the automation server processor 402B, the automation server storing apparatus 403B, and the automation server communication interface 404B.

In the automation server storing apparatus 403B, the system monitoring information 320, the scaling execution information 321, and the task execution information 322 are stored. Input-output information from and to the business system 105 in the virtual cloud 103 for business and the setting tool 304 in the storage management server 303 and input-output information exchanged from and to the client PC 306 via a Web browser are input and output to and from the automation server communication interface 404B.

In the task management program 314, task registration processing 501, task execution processing 502, and task execution history display processing 503 are included. The task registration processing 501 is processing of registering, as a task, deployment of the scaling system 100 ordered from the client PC 306, scale-out of the scaling system 100 ordered from scaling necessity determination processing 508 to be described later, and so forth. The task execution processing 502 is processing of executing the registered task and calls the scaling execution program 317 according to need. For example, when scale-out is registered as a task, the task execution processing 502 calls and executes scale-out processing 511 to be described later. The task execution history display processing 503 is processing of displaying the execution history of the task on output apparatus.

In the system deployment program 315, VM deployment and RDB setting processing 504, storage volume allocation processing 505, and data load processing 506 are included. The VM deployment and RDB setting processing 504 is processing of executing deployment of a virtual machine and setting of the RDB. The storage volume allocation processing 505 is processing of deciding the correspondence relation between LDEVs of the storage apparatus 104 and worker nodes. The data load processing 506 is processing of causing each LDEV of the storage apparatus 104 to read in necessary information.

The scaling execution determination program 316 executes system threshold determination result acquisition processing 507 and the scaling necessity determination processing 508. The system threshold determination result acquisition processing 507 is processing of acquiring the processing result of the threshold determination processing 410 of the system threshold determination program 312. The scaling necessity determination processing 508 is processing of determining whether or not scale-up, scale-down, scale-out, and scale-in are necessary.

The scaling execution program 317 executes scale-up processing 509, scale-down processing 510, the scale-out processing 511, and scale-in processing 512. The scale-up processing 509 is processing of scaling up the business system 105. The scale-down processing 510 is processing of scaling down the business system 105. The scale-out processing 511 is processing of scaling out the business system 105. The scale-in processing 512 is processing of scaling in the business system 105.

Details of the system configuration information 318, the system performance information 319, the system monitoring information 320, the scaling execution information 321, and the task execution information 322 will be described with reference to FIG. 5 to FIG. 9. Each of the system configuration information 318, the system performance information 319, the system monitoring information 320, the scaling execution information 321, and the task execution information 322 includes plural tables as described below. However, the following description is one example and the storage system of the information is not limited to the table format. Furthermore, in the following, when the same kind of information is included in plural tables, description is omitted regarding the second and subsequent appearances of the information.

FIG. 5 is a diagram illustrating details of the system configuration information 318. The system configuration information 318 is composed of a system table 601, an RDB server table 602, an RDB node configuration table 603, a node table 604, an LDEV table 605, and a system configuration table 606. The system configuration information 318 is automatically generated by processing to be described later. The system table 601, the RDB server table 602, and the system configuration table 606 are created as each one table, and records corresponding to the number of RDB servers are added to each table every date and time of information collection. The RDB node configuration table 603 and the node table 604 are created as each one table, and records corresponding to the number of nodes are added to each table every date and time of information collection. To the LDEV table 605, the same number of records as the number of volumes (LDEV) of the storage apparatus 104 are added every date and time of information collection.

Each record of the system table 601 is composed of fields of date and time 607, a system name 608, and an RDB server name 609. The date and time 607 is information on date and clock time that serves as a criterion for determining whether or not information stored in the system table 601 is new or old. The system name 608 is the name of the calculation system S controlled by the scaling system 100. Since the calculation system S corresponds to the application 108 in the business system 105, the system name 608 may be read as the name of the application 108. The RDB server name 609 is an identifier to identify the database server (VM) included in the calculation system S. For example, in the example illustrated in FIG. 1, the database server 107 or the VM 116 is set in the RDB server name 609.

Each record of the RDB server table 602 is composed of fields of date and time 610, a system name 611, an RDB server name 612, an RDB server type 613, an RDB instance ID 614, an IP address 615 of the RDB, and a storage port name 616.

The date and time 610 is information on date and clock time that serves as a criterion for determining whether or not information stored in the RDB server table 602 is new or old. The system name 611 and the RDB server name 612 are the same kind of information as the system name 608 and the RDB server name 609, respectively. Hereinafter, when the name of information is the same, description showing that the information is the same kind of information is also not made. The RDB server type 613 is identification information of resources allocated to the database server. For example, this identification information is "minimum configuration" that is a combination of a CPU with four cores and a memory of 8 GB, "memory-increased configuration" that is a combination of a CPU with four cores and a memory of 16 GB, "maximum configuration" that is a combination of a CPU with 32 cores and a memory of 64 GB, or the like.

The RDB instance ID 614 is the instance ID of the database server 107. The IP address 615 of the RDB is the IP address of the database server 107. The storage port name 616 is the identifiers of all ports that are ports that the storage apparatus 104 has and are used by the calculation system S.

Each record of the RDB node configuration table 603 is composed of fields of date and time 617, an RDB server name 618, a node name 619, and a node type 620. The node name 619 is the name of the node, for example, "first worker node." The node type 620 is the type of the node, for example, "worker node" or "coordinator node."

Each record of the node table 604 is composed of fields of date and time 621, an RDB server name 622, a node name 623, a node type 624, an IP address 625 of the node, and a path 626 of the node, and a port number 627 of the node. The IP address 625 of the node is the IP address of the server in which the node operates. The path 626 of the node is a so-called directory in a virtual machine. For example, a certain storage volume looks to be "/dev/sda1" from the server and "/dev/sda1" is used in such a manner as to be mounted on a directory "/mnt/disk1" of the first worker node 110. The port number 627 of the node is the storage port used for accessing the storage volume in which data of the node is stored from the server, for example, "CL1-A" or the like.

Each record of the LDEV table 605 is composed of fields of date and time 628, a node name 629, a path 630 of the device, an LDEV ID 631, an LDEV name 632, a storage port name 633, and an LUN ID 634. The date and time 628 is information on date and clock time that serves as a criterion for determining whether or not information stored in the LDEV table 605 is new or old. The path 630 of the device is information showing the logical position of the LDEV and is, for example, "/mnt/disk1." The LDEV ID 631 is the identifier of the LDEV. The LDEV name 632 is the name of the LDEV. The LUN ID 634 is the logical device number (logical unit number) of the LDEV.

Each record of the system configuration table 606 is composed of fields of date and time 635, a system name 636, an RDB server name 637, a node name 638, an LDEV name 639, and a storage port name 640. The date and time 635 is information on date and clock time that serves as a criterion for determining whether or not information stored in the system configuration table 606 is new or old.

FIG. 6 is a diagram illustrating details of the system performance information 319. The system performance information 319 is composed of a server performance table 701, a storage port performance table 702, a system performance table 703, a server device performance table 704, a storage LDEV performance table 705, and a node performance table 706. For the system performance information 319, an operating system of each of the database server and the storage apparatus 104 updates the respective items. As each of the server performance table 701, the system performance table 703, and the server device performance table 704, as many tables as the number of database servers are generated. As the storage port performance table 702, as many tables as the number of storage ports that the storage apparatus 104 has are generated. As the storage LDEV performance table 705, as many tables as the number of LDEVs generated in the storage apparatus 104 are generated.

Each record of the server performance table 701 is composed of fields of date and time 708, an RDB server name 709, a CPU usage 710, a network usage 711, a disk transfer rate 712, and a disk IOPS 713. The CPU usage 710, the network usage 711, the disk transfer rate 712, and the disk IOPS 713 are the CPU usage, the network usage, the disk transfer rate, and the disk IOPS of the server that change as needed.

Each record of the storage port performance table 702 is composed of fields of date and time 714, a storage name 715, a storage port name 716, a transfer rate 717 of the storage port, an IOPS 718 of the storage port, and a response time 719 of the storage port. The date and time 714 is information on date and clock time that serves as a criterion for determining whether or not information stored in the storage port performance table 702 is new or old. The storage name 715 is the name of the storage apparatus 104 including the storage port. The transfer rate 717 of the storage port, the IOPS 718 of the storage port, and the response time 719 of the storage port are the transfer rate, the IOPS, and the response speed of the storage port that change as needed.

Each record of the system performance table 703 is composed of fields of date and time 720, a system name 721, a CPU usage 722 of the RDB server, a network usage 723 of the RDB server, a disk IOPS 724 of the RDB server, a disk transfer rate 725 of the RDB server, an IOPS 726 of the storage port, a transfer rate 727 of the storage port, and a response time 728 of the storage port. The CPU usage 722 of the RDB server, the network usage 723 of the RDB server, the disk IOPS 724 of the RDB server, and the disk transfer rate 725 of the RDB server are the same kind of information as the CPU usage 710, the network usage 711, the disk IOPS 713, and the disk transfer rate 712, respectively.

Each record of the server device performance table 704 is composed of fields of date and time 729, an RDB server name 730, a path 731 of the device, a transfer rate 732 of the device, and an IOPS 733 of the device. Each record of the storage LDEV performance table 705 is composed of fields of date and time 734, a storage name 735, an LDEV ID 736, a transfer rate 737 of the LDEV, an IOPS 738 of the LDEV, and a response time 739 of the LDEV.

Each record of the node performance table 706 is composed of fields of date and time 740, a system name 741, an RDB server name 742, a node name 743, a path 744 of the device, an IOPS 745 of the device, a transfer rate 746 of the device, a transfer rate 747 of the LDEV, an IOPS 748 of the LDEV, and a response time 749 of the LDEV.

FIG. 7 is a diagram illustrating details of the system monitoring information 320. The system monitoring information 320 is composed of a server performance threshold table 801, a storage performance threshold table 802, an alert notification table 803, a system monitoring result table 804, and a node monitoring result table 805. The server performance threshold table 801 and the storage performance threshold table 802 of the system monitoring information 320 are generated by the operations manager. The alert notification table 803, the system monitoring result table 804, and the node monitoring result table 805 are generated by automatic processing. The alert notification table 803 has the same number of records as alert notifications. To the system monitoring result table 804, the same number of records as database servers are added every date and time of information collection. To the node monitoring result table 805, the same number of records as worker nodes are added every date and time of information collection.

Each record of the server performance threshold table 801 is composed of fields of the threshold 806 of the CPU usage, a threshold 807 of the network usage, a threshold 808 of the disk transfer rate, a threshold 809 of the disk IOPS, a threshold 810 of the transfer rate of the device, a threshold 811 of the IOPS of the device. The threshold 806 of the CPU usage is a threshold used for abnormality sensing of the value of the CPU usage 710. For example, the value of the CPU usage 710 is determined to be normal when falling within the range of the threshold, and is determined to be abnormal when being outside the range of the threshold. The same applies also to thresholds to be described below. The threshold 807 of the network usage is a threshold used for abnormality sensing of the value of the network usage 711. The threshold 808 of the disk transfer rate is a threshold used for abnormality sensing of the value of the disk transfer rate 712. The threshold 809 of the disk IOPS is a threshold used for abnormality sensing of the value of the disk IOPS 713. The threshold 810 of the transfer rate of the device is a threshold used for abnormality sensing of the value of the transfer rate 732 of the device. The threshold 811 of the IOPS of the device is a threshold used for abnormality sensing of the value of the IOPS 733 of the device.

Each record of the storage performance threshold table 802 is composed of fields of a threshold 812 of the transfer rate of the port, a threshold 813 of the IOPS of the port, a threshold 814 of the transfer rate of the LDEV, and a threshold 815 of the IOPS of the LDEV. The threshold 812 of the transfer rate of the port is a threshold used for abnormality sensing of the value of the transfer rate 717 of the storage port. The threshold 813 of the IOPS of the port is a threshold used for abnormality sensing of the value of the IOPS 718 of the storage port. The threshold 814 of the transfer rate of the LDEV is a threshold used for abnormality sensing of the value of the transfer rate 737 of the LDEV. The threshold 815 of the IOPS of the LDEV is a threshold used for abnormality sensing of the value of the IOPS 738 of the LDEV.

Each record of the alert notification table 803 is composed of fields of date and time 816, an alert type 817, a system name 818, a subject (RDB name or storage name) 819, a metric type 820, and an abnormal value 821. The alert type 817 is the type of the alert. The subject 819 is an RDB name or storage name deemed as the subject of the alert. The metric type 820 and the abnormal value 821 show which metric is an abnormal value of what value.

Each record of the system monitoring result table 804 is composed of fields of date and time 822, a system name 823, a threshold determination result 824 of the CPU usage of the RDB server, a threshold determination result 825 of the network usage of the RDB server, a threshold determination result 826 of the disk IOPS of the RDB server, a threshold determination result 827 of the disk transfer rate of the RDB server, a threshold determination result 828 of the IOPS of the storage port, and a threshold determination result 829 of the transfer rate of the storage port.

The threshold determination result 824 of the CPU usage of the RDB server is the result of abnormality sensing by use of the threshold 806 of the CPU usage and the CPU usage 710. The threshold determination result 825 of the network usage of the RDB server is the result of abnormality sensing by use of the threshold 807 of the network usage and the network usage 711. The threshold determination result 826 of the disk IOPS of the RDB server is the result of abnormality sensing by use of the threshold 809 of the disk IOPS and the disk IOPS 713. The threshold determination result 827 of the disk transfer rate of the RDB server is the result of abnormality sensing by use of the threshold 808 of the disk transfer rate and the disk transfer rate 712. The threshold determination result 828 of the IOPS of the storage port is the result of abnormality sensing by use of the threshold 813 of the IOPS of the port and the IOPS 718 of the storage port. The threshold determination result 829 of the transfer rate of the storage port is the result of abnormality sensing by use of the threshold 812 of the transfer rate of the port and the transfer rate 717 of the storage port.

Each record of the node monitoring result table 805 is composed of fields of date and time 830, a system name 831, an RDB server name 832, a node name 833, a path 834 of the device, a threshold determination result 835 of the IOPS of the device, a threshold determination result 836 of the transfer rate of the device, a threshold determination result 837 of the transfer rate of the LDEV, and a threshold determination result 838 of the IOPS of the LDEV.

FIG. 8 is a diagram illustrating details of the scaling execution information 321. The scaling execution information 321 is composed of an RDB scaling determination result table 901, an RDB scale-up execution table 902, an RDB scale-up result table 903, a node movement determination result table 904, an RDB scale-out execution table 905, and a scale-out result table 906. To the RDB scaling determination result table 901 of the scaling execution information 321, the same number of records as database servers are added every time scaling determination is executed. To the RDB scale-up execution table 902 and the RDB scale-up result table 903, as many records as the number of database servers about which it is determined that scale-up is necessary are added. In the node movement determination result table 904, the same number of records as worker nodes are generated every time node movement determination is executed. To the RDB scale-out execution table 905 and the scale-out result table 906, as many records as the number of database servers about which it is determined that scale-out is necessary are added.

Each record of the RDB scaling determination result table 901 is composed of fields of date and time 907, a system name 908, an RDB server name 909, a server type 910, and scaling necessity determination 911. The scaling necessity determination 911 is any of scale-in, scale-out, scale-up, and scale-down.

Each record of the RDB scale-up execution table 902 is composed of fields of a task type 912, a system name 913, an RDB server name 914, a server type 915, a scale-up server type 916, and a script program 917. The server type 915 is the type of the present server before scale-up is executed. The scale-up server type 916 is the type of the server after the scale-up. The script program 917 is a script program used for scale-up processing.

Each record of the RDB scale-up result table 903 is composed of fields of a system name 918, an RDB server name 919, a before-scale-up server type 920, and an after-scale-up server type 921. The before-scale-up server type 920 and the after-scale-up server type 921 are the same kind as the server type 915 and the scale-up server type 916, respectively.

Each record of the node movement determination result table 904 is composed of fields of date and time 922, a system name 923, an RDB server name 924, a node name 925, an LDEV name 926, a storage port name 927, scaling necessity determination 928, and movement necessity determination 929. The scaling necessity determination 928 is the necessity determination result of each of scale-in, scale-out, scale-up, and scale-down. The movement necessity determination 929 is the result of determination of whether or not movement to another virtual server in association with scale-up is necessary.

Each record of the RDB scale-out execution table 905 is composed of fields of a task type 930, an RDB (coordinator) server name 931, an RDB (worker) server name 932, a server type 933, the number of workers 934, a worker node name (start number) 935, and a script program 936. The RDB (coordinator) server name 931 is the name of the server having a coordinator node. The RDB (worker) server name 932 is the name of the server having worker nodes. The number of workers 934 is the number of worker nodes that become the subject of scale-out processing. The worker node name (start number) 935 is the youngest number in identification numbers on the premise that the identification numbers of the worker nodes that become the subject of the scale-out processing are consecutive numbers. The script program 936 is a script program used for the scale-out processing.

Each record of the scale-out result table 906 is composed of fields of a before-movement RDB server name 937, an after-movement RDB server name 938, a before-movement node name 939, an after-movement node name 940, a before-movement storage port name 941, an after-movement storage port name 942, an LDEV ID 943, and an LDEV name 944.

FIG. 9 is a diagram illustrating details of the task execution information 322. The task execution information 322 is composed of a task execution management table 1001, a single server deployment table 1002, a multi-server deployment table 1003, an LDEV creation table 1004, and an LDEV association table 1005. The task execution information 322 is generated by the operations manager in some cases, and the system automatically registers the task execution information 322 on the basis of a scaling execution determination result in some cases. Related tables are created according to the task type of the task execution information 322. For example, when the task type is "deployment," the single server deployment table 1002 or the multi-server deployment table 1003, the LDEV creation table 1004, and the LDEV association table 1005 are created.

Each record of the task execution management table 1001 is composed of fields of a task ID 1006, a state 1007, a task type 1008, registration date and time 1009, start date and time 1010, ant end date and time 1011. The task ID 1006 is an identifier to identify each task. The state 1007 is the state of each task and is, for example, "normal." The task type 1008 is the type of the task and is, for example, "system deployment," or "scale-out." The registration date and time 1009, the start date and time 1010, and the end date and time 1011 are the date and time when the task has been registered, started, and ended.

Each record of the single server deployment table 1002 is composed of fields of a task type 1012, an RDB server name 1013, a server type 1014, the number of workers 1015, and a script program 1016. The number of workers 1015 is the number of worker nodes created at the time of deployment. In the present embodiment, the maximum number of worker nodes that can be created, for example, "64" or "256," is set. The script program 1016 is a script program for deploying a single server.

Each record of the multi-server deployment table 1003 is composed of fields of a task type 1017, an RDB (coordinator) server name 1018, an RDB (coordinator) server type 1019, an RDB (worker) server name (start number) 1020, an RDB (worker) server type 1021, the number of workers 1022, and a script program 1023. The RDB (coordinator) server name 1018 is the name of the coordinator node. The RDB (coordinator) server type 1019 is the server type of the coordinator node. The RDB (worker) server name (start number) 1020 is the start number of numerals on the premise that consecutive numbers are used as the names of worker nodes. The RDB (worker) server type 1021 is the server type of the worker nodes.

Each record of the LDEV creation table 1004 is composed of fields of a task type 1024, an LDEV ID (start number) 1025, an LDEV name (start number) 1026, an LDEV size 1027, the number of volumes 1028, and a script program 1029. The LDEV size 1027 is the size of each logical volume configured in the storage apparatus 104. The number of volumes 1028 is the total number of logical volumes configured in the storage apparatus 104. As the number of volumes 1028, a number equivalent to or larger than the number of workers 1015 is set. The script program 1029 is a script program that creates the logical volume in the storage apparatus 104.

Each record of the LDEV association table 1005 is composed of fields of a task type 1030, an RDB server name 1031, a node name 1032, an LDEV ID 1033, an LDEV name 1034, a storage port name 1035, and a script program 1036. In the LDEV association table 1005, information that associates each LDEV generated in the storage apparatus 104 with a respective one of worker nodes generated in the virtual cloud 103 for business is stored. The script program 1036 is a script program that executes processing of associating the worker nodes with the LDEVs.

FIG. 10 is a diagram illustrating monitoring processing executed by the monitoring server 308. However, the system table 601 and so forth are necessary to execute the monitoring processing flow and they are created in the process of automation processing to be described next. Thus, the monitoring processing to be described below becomes executable after execution of the system deployment program 315 to be described later in the automation processing has been completed.

In the monitoring processing, first, the in-system server information acquisition processing 405, the in-server RDB configuration information acquisition processing 406, and the related LDEV information acquisition processing 407 of the system configuration information collection program 310 are executed. The system configuration information collection program 310 reads in the system table 601, the RDB server table 602, the RDB node configuration table 603, the node table 604, and the LDEV table 605 and outputs the system configuration table 606.

Next, the server performance data collection processing 408 and the storage performance data collection processing 409 of the system performance information collection program 311 are executed. The system performance information collection program 311 reads in the server performance table 701 and the storage port performance table 702 and outputs the system performance table 703. Furthermore, the system performance information collection program 311 reads in the server device performance table 704 and the storage LDEV performance table 705 and outputs the node performance table 706.

Next, the threshold determination processing 410 and the alert notification processing 411 of the system threshold determination program 312 are executed. In these kinds of processing, the system performance table 703, the node performance table 706, the server performance threshold table 801, and the storage performance threshold table 802 are used and the system monitoring result table 804, the node monitoring result table 805, and the alert notification table 803 are output.

In the subsequent system monitoring result display program 313, the system configuration information display processing 412 and the system performance information display processing 413 are executed. In these kinds of processing, information on the system configuration table 606, the system performance table 703, and the node performance table 706 are displayed.

Figure 11:
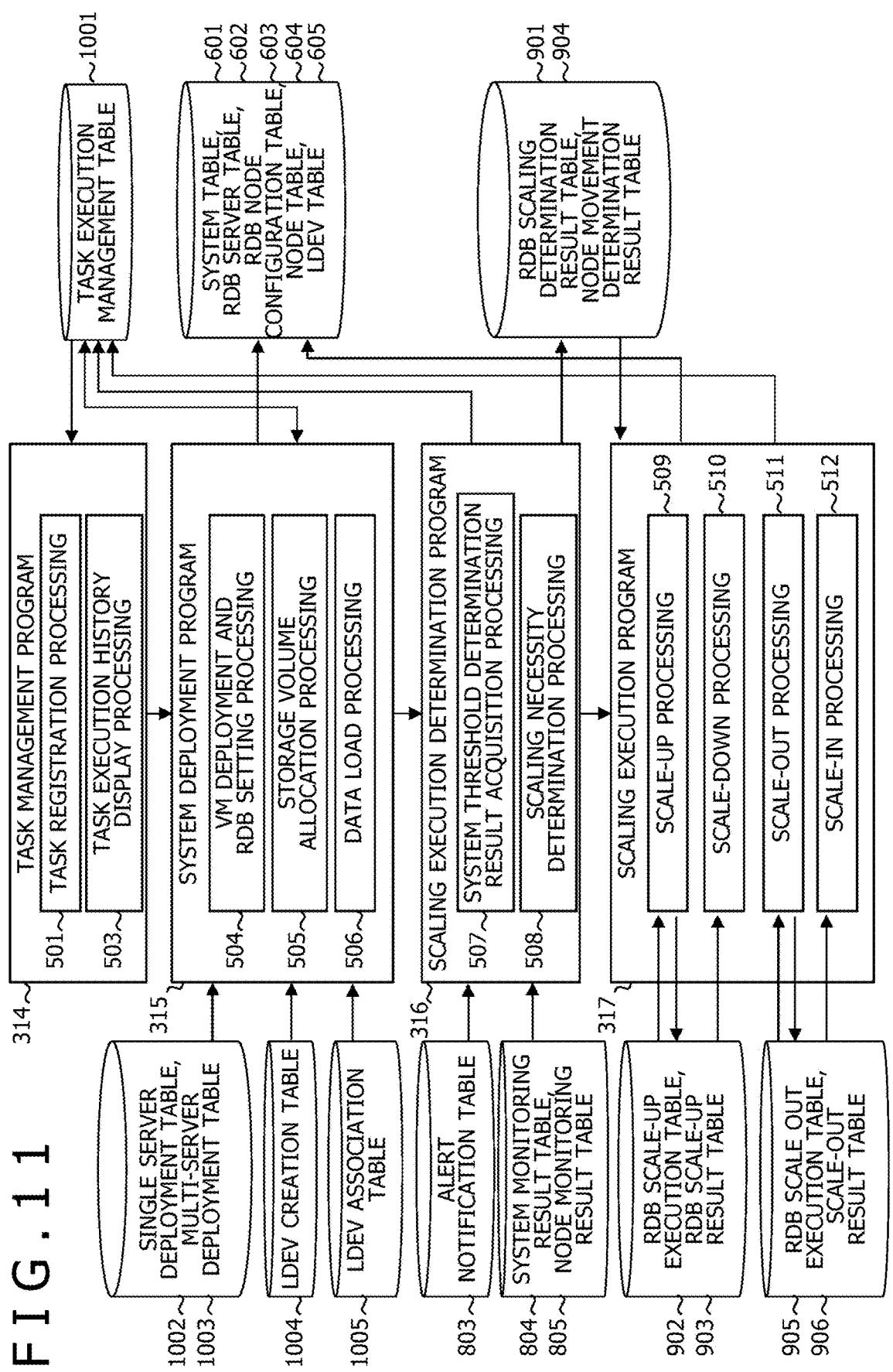
FIG. 11 is a diagram illustrating automation processing executed by the operations automation server.

FIG. 11 is a diagram illustrating the automation processing executed by the operations automation server 309. In the automation processing, first, the task registration processing 501 and the task execution history display processing 503 of the task management program 314 are executed. In these kinds of processing, the task execution management table 1001 is read in.

Next, the VM deployment and RDB setting processing 504, the storage volume allocation processing 505, and the data load processing 506 of the system deployment program 315 are executed. The system deployment program 315 reads in the task execution management table 1001, the single server deployment table 1002, the multi-server deployment table 1003, the LDEV creation table 1004, and the LDEV association table 1005. The system deployment program 315 outputs the system table 601, the RDB server table 602, the RDB node configuration table 603, the node table 604, and the LDEV table 605 and updates the task execution management table 1001.

Next, the system threshold determination result acquisition processing 507 and the scaling necessity determination processing 508 of the scaling execution determination program 316 are executed. The scaling execution determination program 316 reads in the alert notification table 803, the system monitoring result table 804, and the node monitoring result table 805 and outputs the RDB scaling determination result table 901, the node movement determination result table 904, and the task execution management table 1001.

Next, the scaling execution program 317 reads in the task execution management table 1001, the RDB scaling determination result table 901, and the node movement determination result table 904 and updates the task execution management table 1001. The scaling execution program 317 executes any kind of processing on the basis of the description of the task execution management table 1001. The scale-up processing 509 inputs the RDB scale-up execution table 902 and outputs the RDB scale-up result table 903. The scale-down processing 510 inputs the RDB scale-up result table 903. The scale-out processing 511 inputs the RDB scale-out execution table 905 and outputs the scale-out result table 906. The scale-in processing 512 inputs the scale-out result table 906.

Figure 12:
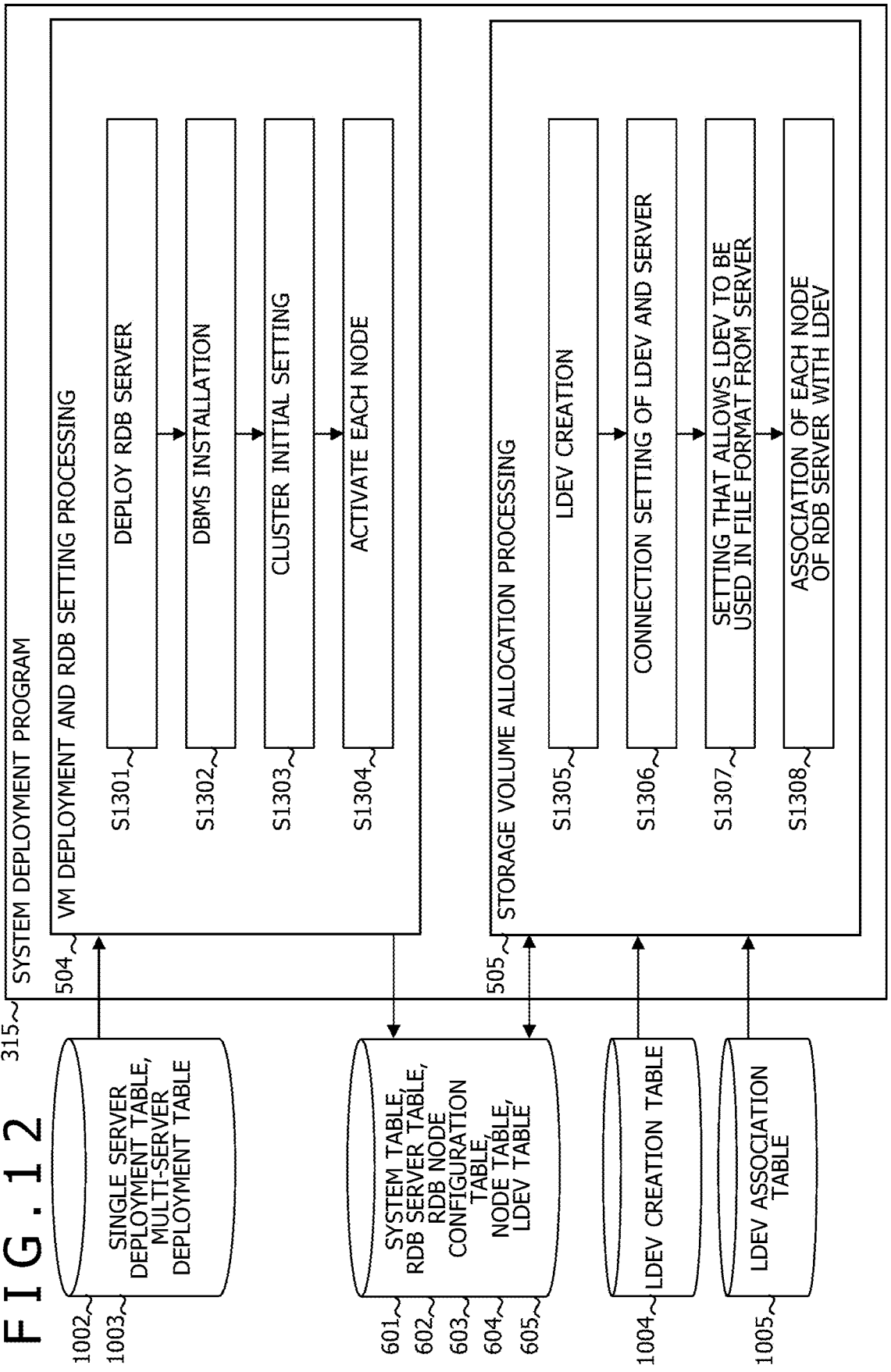
FIG. 12 is a diagram illustrating processing executed by a system deployment program.

FIG. 12 is a diagram illustrating processing executed by the system deployment program 315. The VM deployment and RDB setting processing 504 of the system deployment program 315 first reads in the single server deployment table 1002 or the multi-server deployment table 1003. The operations manager may indicate which table to read in by using means that is not illustrated in the diagram, or the operations manager may indirectly indicate which table to read in by inputting information to only either the single server deployment table 1002 or the multi-server deployment table 1003.

In the VM deployment and RDB setting processing 504, on the basis of the read-in single server deployment table 1002 or multi-server deployment table 1003, an RDB server is deployed (S1301). Next, the system deployment program 315 installs a database management system (DBMS) (S1302), and executes initial setting of a cluster (S1303), and activates each node (S1304). The processing of the above-described S1301 to S1034 is implemented by executing the script program 1016 or the script program 1023, for example.

Moreover, the system deployment program 315 outputs the system table 601, the RDB server table 602, the RDB node configuration table 603, and the node table 604. The output of these tables is implemented by executing the script program 1016 or the script program 1023, for example. These script programs create the above-described tables with reference to information described in the single server deployment table 1002 or the multi-server deployment table 1003. For example, information on the RDB server name 1013 in the single server deployment table 1002 is transcribed to the RDB server name 609 of the system table 601 and so forth.

In the storage volume allocation processing 505, the system table 601, the RDB server table 602, the RDB node configuration table 603, the node table 604, the LDEV creation table 1004, and the LDEV association table 1005 are read in, and the LDEV table 605 is output and the system table 601 is updated. In the storage volume allocation processing 505, first an LDEV is created (S1305). Next, connection setting of the LDEV and the server (S1306) is executed. Then, setting that allows the LDEV to be used in a file format from the database server 107 (S1307) is executed and association of each node of the RDB server with the LDEV (S1308) is executed.

Specific processing for creating the LDEV in S1305 is described in the script program 1029 of the LDEV creation table 1004, for example. This script program 1029 operates with reference to other pieces of information included in the LDEV creation table 1004. Specific processing for executing the processing of S1306 to S1308 is described in the script program 1036 of the LDEV association table 1005, for example. This script program 1036 operates with reference to other pieces of information included in the LDEV association table 1005.

Figure 13:
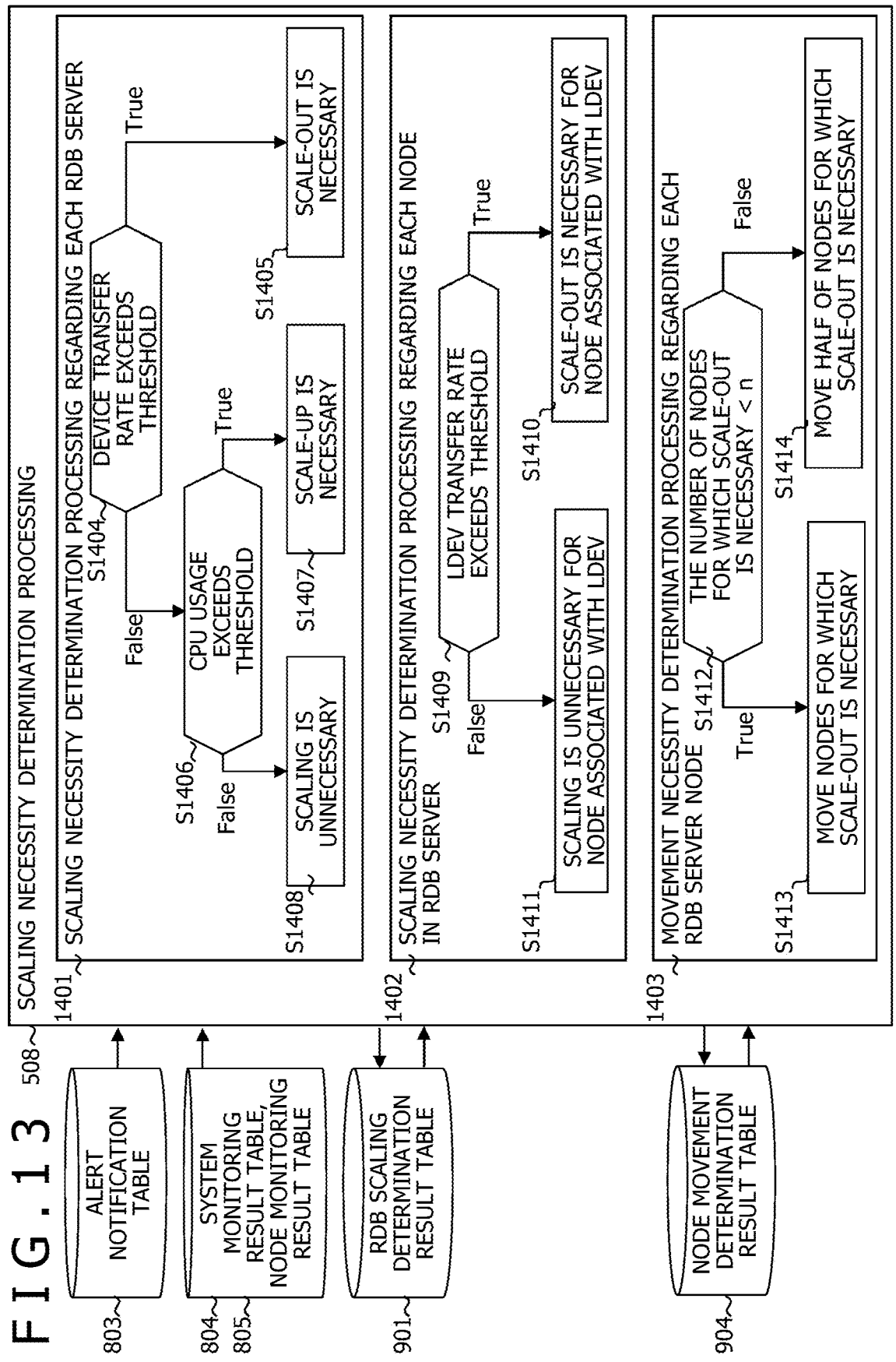
FIG. 13 is a diagram illustrating details of scaling necessity determination processing executed by a scaling execution determination program.

FIG. 13 is a diagram illustrating details of the scaling necessity determination processing 508 executed by the scaling execution determination program 316. In the scaling necessity determination processing 508, the alert notification table 803, the system monitoring result table 804, and the node monitoring result table 805 are read in and the RDB scaling determination result table 901 and the node movement determination result table 904 are output. The scaling necessity determination processing 508 is composed of scaling necessity determination processing 1401 regarding each RDB server, scaling necessity determination processing 1402 regarding each node in the RDB server, and movement necessity determination processing 1403 regarding each RDB server node.

In the scaling necessity determination processing 1401 regarding each RDB server, the scaling execution determination program 316 first executes threshold excess determination of the device transfer rate (S1401). Specifically, the scaling execution determination program 316 compares the transfer rate 732 of the device in the server device performance table 704 with the threshold 810 of the transfer rate of the device in the server performance threshold table 801. When determining that the device transfer rate exceeds the threshold, the scaling execution determination program 316 stores information showing that scale-out is necessary in the RDB scaling determination result table 901 (S1405). When determining that the device transfer rate does not exceed the threshold, the scaling execution determination program 316 proceeds to S1406.

In S1406, the scaling execution determination program 316 determines whether or not the CPU usage exceeds a threshold. Specifically, the scaling execution determination program 316 compares the CPU usage 710 in the server performance table 701 with the threshold 806 of the CPU usage in the server performance threshold table 801. When determining that the CPU usage exceeds the threshold, the scaling execution determination program 316 stores information showing that scale-up is necessary in the RDB scaling determination result table 901 (S1407). When determining that the CPU usage does not exceed the threshold, the scaling execution determination program 316 stores information showing that scaling is unnecessary in the RDB scaling determination result table 901 (S1408).

In the scaling necessity determination processing 1402 regarding each node in the RDB server, the scaling execution determination program 316 first executes threshold excess determination of the LDEV transfer rate (S1409). Specifically, the scaling execution determination program 316 compares the transfer rate 737 of the LDEV in the storage LDEV performance table 705 with the threshold 814 of the transfer rate of the LDEV in the storage performance threshold table 802. When determining that the LDEV transfer rate exceeds the threshold, the scaling execution determination program 316 stores, in the RDB scaling determination result table 901, information showing that scale-out is necessary for the node associated with the LDEV of the determination subject in S1409 (S1410). When determining that the LDEV transfer rate does not exceed the threshold, the scaling execution determination program 316 stores, in the RDB scaling determination result table 901, information showing that scaling is not necessary for the node associated with the LDEV of the determination subject in S1409 (S1411).

When it is determined that scale-out is necessary (S1405) in the scaling necessity determination processing 1401 regarding each RDB server, not only whether or not scale-out is necessary is determined regarding each node by the scaling necessity determination processing 1402 regarding each node in the RDB server, but whether or not scale-out is necessary may be determined on the basis of the magnitude of the IOPS of each node.

In the movement necessity determination processing 1403 regarding each RDB server node, the scaling execution determination program 316 refers to all node movement determination result tables 904 and determines whether or not the number of nodes for which scale-out is necessary is smaller than a predetermined threshold "n" (S1412). When determining that the number of nodes for which scale-out is necessary is smaller than "n," the scaling execution determination program 316 moves the nodes for which scale-out is necessary to newly-created nodes (S1413). When determining that the number of nodes for which scale-out is necessary is equal to or larger than "n," the scaling execution determination program 316 moves half of the nodes for which scale-out is necessary to newly-created nodes (S1414).

Figure 14:
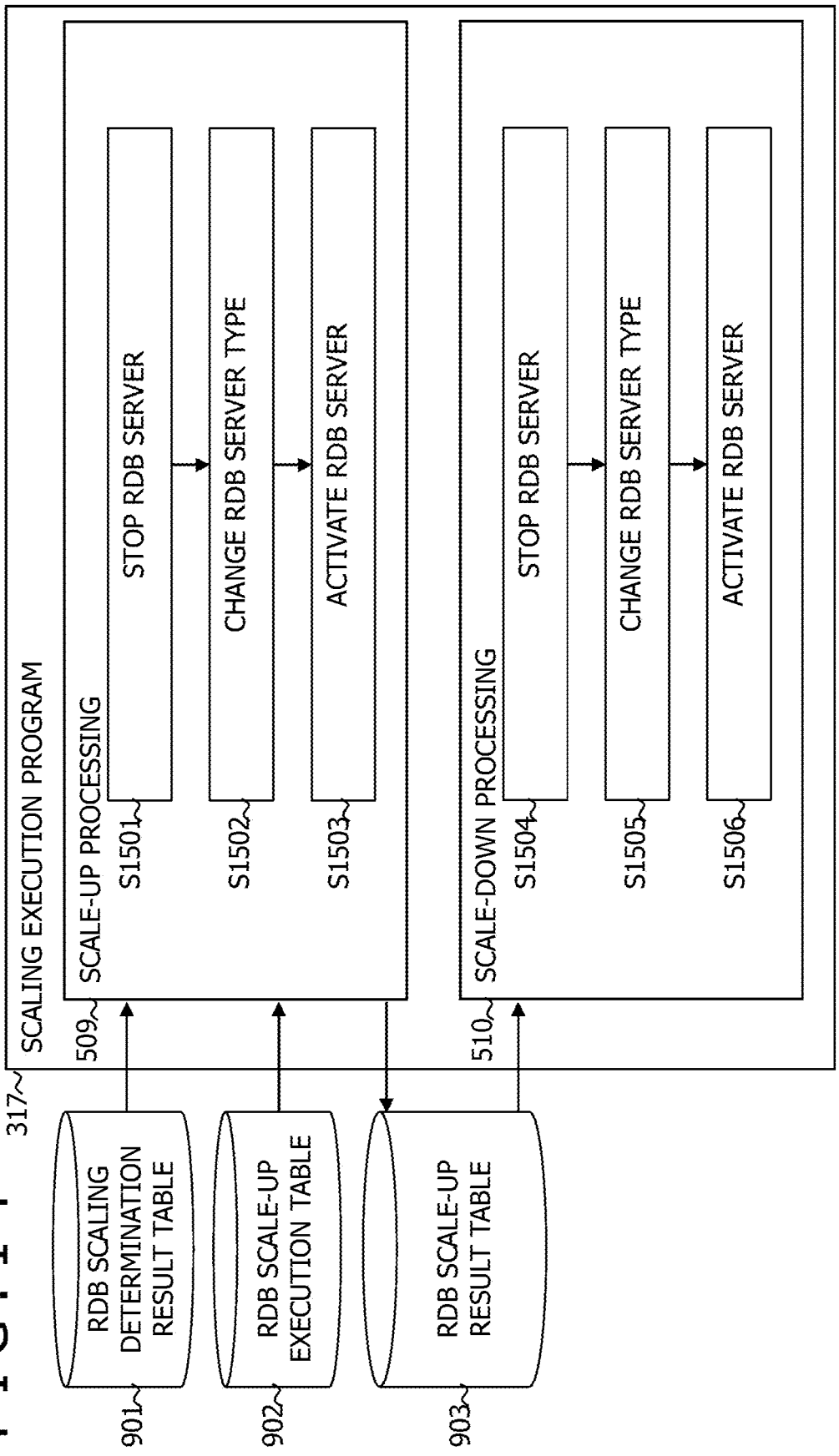
FIG. 14 is a diagram illustrating scale-up processing and scale-down processing executed by a scaling execution program.

FIG. 14 is a diagram illustrating the scale-up processing 509 and the scale-down processing 510 executed by the scaling execution program 317. In the scale-up processing 509, the scaling execution program 317 reads in the RDB scaling determination result table 901 and the RDB scale-up execution table 902 and outputs the RDB scale-up result table 903. Specifically, the scaling execution program 317 selects, as the processing subject, the database server about which it is described that scale-up is necessary in the scaling necessity determination 911 of the RDB scaling determination result table 901, and executes processing of the following S1501 and the subsequent steps.

The scaling execution program 317 first executes stop processing of the RDB server (S1501), and subsequently executes processing of making a change to the RDB server type described in the scale-up server type 916 in the RDB scale-up execution table 902 (S1502). Thereafter, the scaling execution program 317 executes activation processing of the RDB server (S1503) and outputs the RDB scale-up result table 903. The pieces of information stored in the fields 918 to 921 of the RDB scale-up result table 903 are the same as the pieces of information stored in the fields 913 to 916 of the RDB scale-up execution table 902.

The scaling execution program 317 executes the scale-down processing 510 when the processing load of the database server for which the scale-up processing has been executed becomes equal to or lower than a predetermined threshold. The scaling execution program 317 first stops the database server that becomes the subject of the scale-down processing (S1504). Next, the scaling execution program 317 changes the type of the server from the after-scale-up server type 921 of the RDB scale-up result table 903 to the before-scale-up server type 920 (S1505). Then, the scaling execution program 317 activates the server of the changed type (S1506).

Figure 15:
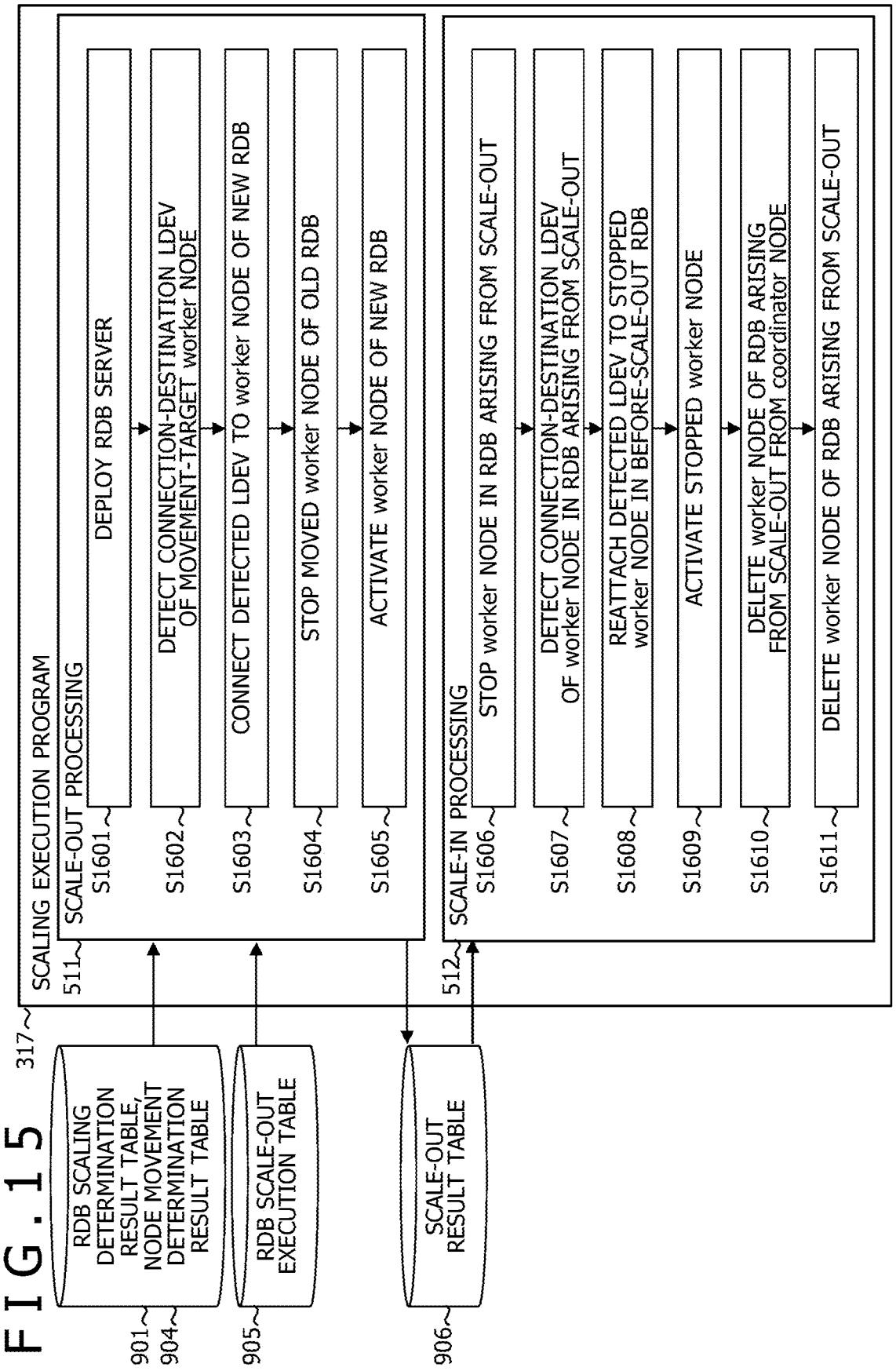
FIG. 15 is a diagram illustrating scale-out processing and scale-in processing executed by the scaling execution program.

FIG. 15 is a diagram illustrating the scale-out processing 511 and the scale-in processing 512 executed by the scaling execution program 317. In the scale-out processing 511, the scaling execution program 317 reads in the RDB scaling determination result table 901, the node movement determination result table 904, and the RDB scale-out execution table 905 and outputs the scale-out result table 906. Specifically, the scaling execution program 317 selects, as the processing subject, the database server about which it is described that scale-out is necessary in the scaling necessity determination 911 of the RDB scaling determination result table 901, and executes processing of the following S1601 and the subsequent steps.

The scaling execution program 317 deploys a new virtual machine as an RDB server in the business system 105 (S1601). Next, the scaling execution program 317 refers to the LDEV name 926 of the node movement determination result table 904 and detects the LDEV that is the connection destination of the movement-target worker node (S1602). Then, the scaling execution program 317 connects the worker node of the new RDB deployed in S1601 to the LDEV detected in S1602 (S1603). Moreover, the scaling execution program 317 stops the movement-target worker node of the old RDB, i.e. the worker node about which the connection destination has been detected in S1602 (S1604).

At last, the scaling execution program 317 activates the worker node of the new RDB, i.e. the worker node of the database server deployed in S1601 (S1605). Then, the scaling execution program 317 describes necessary matters in the scale-out result table 906.

The scaling execution program 317 starts the scale-in processing 512 when the transfer rate 732 of the device of the database server deployed in S1601 is equal to or lower than a predetermined threshold and the transfer rate 737 of the LDEV becomes equal to or lower than a predetermined threshold regarding the LDEV associated with the worker node activated in S1605. In the scale-in processing 512, first, the scaling execution program 317 stops the worker node in the RDB arising from scale-out (S1606), and refers to the LDEV ID 943 or the LDEV name 944 of the scale-out result table 906 and detects the connection-destination LDEV of the worker node in the RDB arising from the scale-out. (S1607)

Next, the scaling execution program 317 identifies the before-movement database server and worker node by referring to the before-movement RDB server name 937 and the before-movement node name 939 and reattaches the detected LDEV to the stopped worker node in the before-scale-out RDB (S1608). Then, the scaling execution program 317 activates the worker node stopped in the scale-out processing (S1609) and deletes the worker node of the database server arising from the scale-out from the coordinator node (S1610). At last, the scaling execution program 317 deletes the worker node in the database server arising from the scale-out (S1611).

Figure 16:
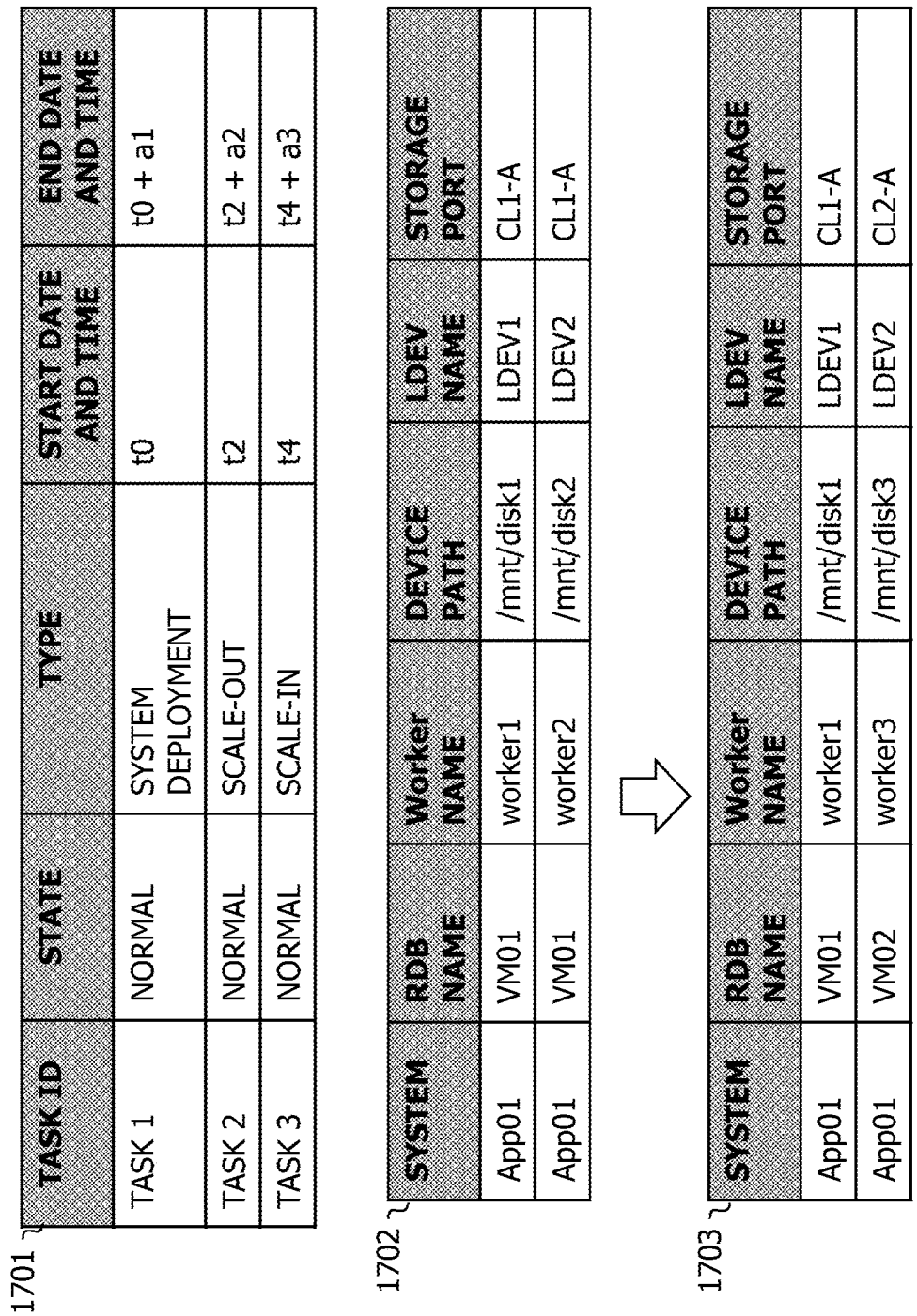
FIG. 16 is a screen display example of an execution result illustrating change in the system performance.
Figure 17:
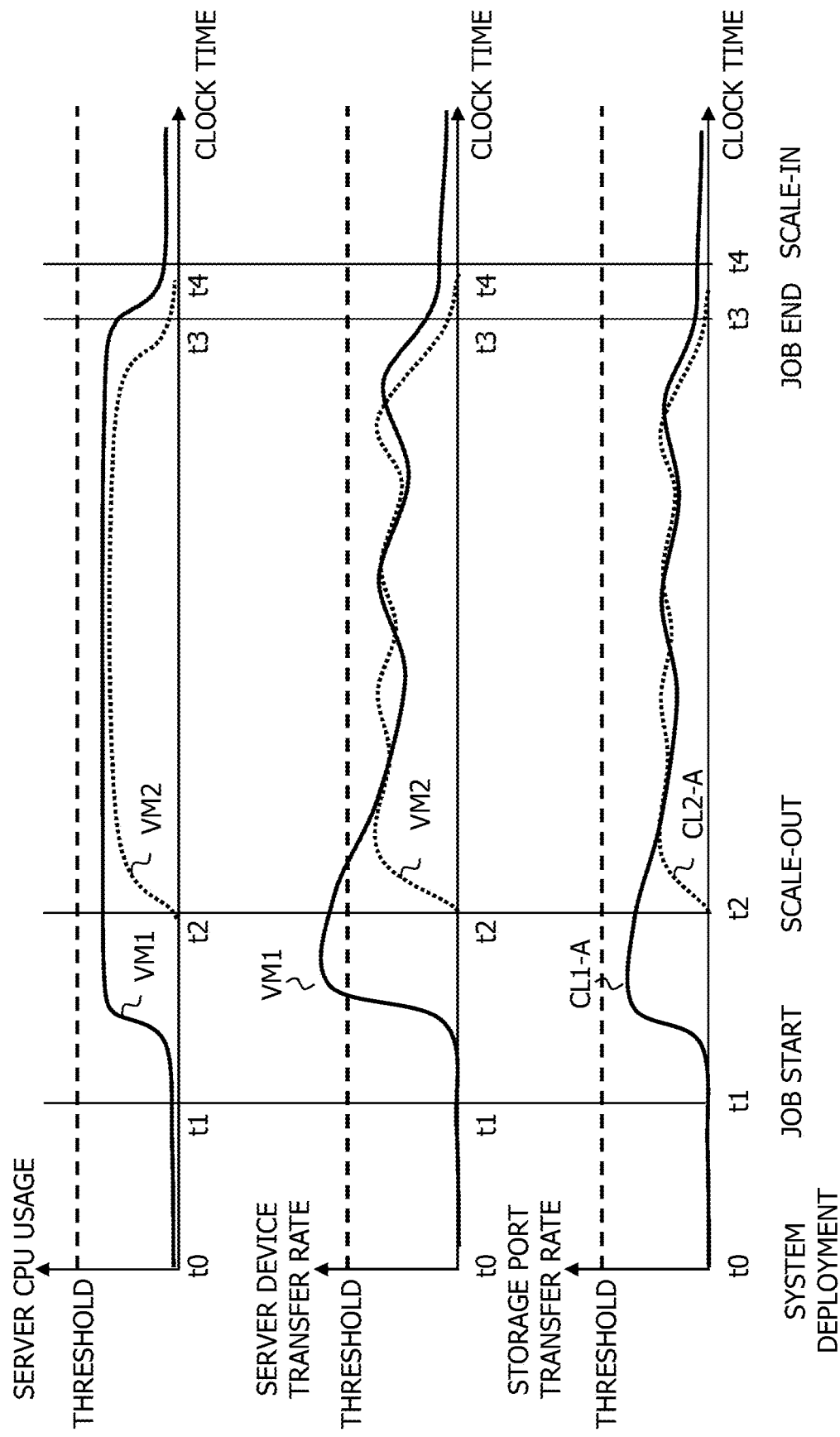
FIG. 17 is a screen display example of the execution result illustrating the change in the system performance.

FIG. 16 and FIG. 17 are screen display examples of an execution result illustrating change in the system performance in association with scale-out processing and scale-in processing. In the example illustrated in FIG. 16 and FIG. 17, deployment of the system is started at a clock time t0 and a job involving a high load is started at a clock time t1. Then, scale-out is started at a clock time t2 and the above-described job ends at a clock time t3. Then, scale-in is started at a clock time t4.

In FIG. 16, a task execution history 1701, a before-scale-out system configuration 1702, and an after-scale-out system configuration 1703 are illustrated. In the task execution history 1701, the type of the task and the clock time of start of the task are included. Specifically, the deployment of the system at the clock time t0, the start of the scale-out at the clock time t2, and the start of the scale-in at the clock time t4 are described. In the before-scale-out system configuration 1702, the system configuration in the state before the scale-out is started, i.e. before the clock time t2, is shown. In the after-scale-out system configuration 1703, the system configuration after the scale-out and before the scale-in is shown.

When the before-scale-out system configuration 1702 and the after-scale-out system configuration 1703 are compared with each other, it turns out that "worker2" moves from "VM01" to "VM02" and the name thereof is changed to "worker3" and "LDEV2" moves from "/mnt/disk2" to "/mnt/disk3." Furthermore, the storage port is changed from only "CL1-A" to "CL1-A" and "CL2-A." Although only two states of the before-scale-out system configuration 1702 and the after-scale-out system configuration 1703 are illustrated in FIG. 16, a system configuration of a state specified by a user may be shown and all system configurations may be shown.

FIG. 17 is a diagram illustrating time-series change in the system performance corresponding to FIG. 16. Specifically, in FIG. 17, time-series change graphs of the server CPU usage, the server device transfer rate, and the storage port transfer rate are illustrated. In all of the three graphs illustrated in FIG. 17, the time elapses in the right direction of the diagram and the clock times correspond with each other in the vertical direction. A dashed line of the horizontal direction illustrated in each of the three graphs of FIG. 17 shows a respective one of thresholds. Specifically, the thresholds are the threshold 806 of the CPU usage, the threshold 808 of the disk transfer rate, and the threshold 812 of the transfer rate of the port.

When the job involving a high load is started at the clock time t1, thereafter the CPU usage and the server device transfer rate of "VM1" and the storage port transfer rate of "CL1-A" rise. Then, the server device transfer rate of "VM1" exceeds the threshold. Therefore, an affirmative determination is made in S1404 in FIG. 13 and the scale-out is executed at the clock time t2. When "worker3" starts operation in "VM2" newly deployed by scale-out processing, the server device transfer rate of "VM1" decreases. Thereafter, when the job ends at the clock time t3, the server device transfer rate of "VM2" decreases and scale-in processing is executed at the clock time t4, so that a return to the state before the execution of the scale-out processing is made.

(Related Art)

FIG. 18 is a diagram illustrating one example of scale-out processing in a configuration of a related art (hereinafter, "related-art configuration") 200Z. In the related-art configuration 200Z, the scale-out processing is executed as follows when the I/O transfer rate of a virtual NIC 115Z of a database server 107Z exceeds a threshold. Specifically, a database server 116Z is newly created and a third worker node 117Z is created in the database server 116Z and is added to a coordinator node 109Z. Moreover, in storage apparatus 104Z, a third LDEV 201Z is newly created and is coupled to the third worker node 117Z by plural connections via a storage port 118Z.

Thereafter, data stored in a first LDEV 112Z that stores data of a first worker node 110Z in the database server 107Z and a second LDEV 114Z that stores data of a second worker node 1112 is redistributed to the third LDEV 201Z that stores data of the third worker node 117Z. When this redistribution of the data is executed between a public cloud 101Z and a near cloud 102Z, a long time is required for data transfer. For this reason, a long time is required until the third worker node 117Z starts processing and it is impossible to respond to a sudden increase in the processing load.

According to the above-described first embodiment, the following operation and effects are obtained.

(1) The scaling system 100 is configured to range over the public cloud 101 in which the database server 107 in which the first worker node 110 and the second worker node 111 operate is set and the near cloud 102 in which the storage apparatus 104 connected to the public cloud 101 by a network is set. The storage apparatus 104 includes the first storage port 113 and the second storage port 118. The storage apparatus 104 includes the first volume 112 accessed by the first worker node 110 and the second volume 114 accessed by the second worker node 111. The VM 116 is set in the public cloud 101. The second worker node 111 is moved to the VM 116 and is caused to operate as the third worker node 117 and the second volume 114 is caused to communicate with the third worker node 117 through the second storage port 118 if the transfer rate of the database server 107 exceeds a predetermined threshold (FIG. 13, S1404: True) or if the transfer rate of the first storage port 113 exceeds a predetermined threshold (FIG. 13, S1409: True) when the first volume 112 and the second volume 114 are executing communication with the database server 107 through the first storage port 113. Thus, reconfiguration of the logical volume in association with the scale-out processing is unnecessary. Therefore, the problem as in the related art illustrated in FIG. 18 does not occur and it is possible to respond to a sudden increase in the processing load.

(2) The database server 107 and the VM 116 are virtual machines. Therefore, scale-up and scale-down can be easily executed according to the calculation load. Furthermore, for the virtual machine, the upper limit of the transfer rate is set lower than that in bare-metal apparatus in many cases. Therefore, the necessity of application of the present invention is high and effects of the present invention are readily obtained.

(3) The scaling system 100 is constructed to range over the public cloud 101 allowed to be used by a large number of unspecified persons and the near cloud 102 allowed to be used by only specific persons. For this reason, flexible change in calculation resources is easy in the public cloud 101 and using the near cloud 102 allows data to be safely managed.

(4) The maximum number of worker nodes allowed to be created are created in the database server 107 and the storage apparatus 104 has at least the same number of volumes as the worker nodes. Therefore, for the calculation system S, scale-out can be repeated plural times according to need.

(5) Each of the first worker node 110 and the second worker node 111 is a node that implements a distributed database. Therefore, for the calculation system S, scale-out of a distributed database can be rapidly implemented.

(6) Half of the worker nodes included in the database server 107 are moved to the VM 116 when the number of worker nodes about which the disk IOPS is equal to or higher than a predetermined threshold or the transfer rate of the corresponding logical volume is equal to or higher than a predetermined threshold is equal to or larger than a predetermined threshold "n" (FIG. 13, S1412: False, S1414). The worker nodes about which the disk IOPS is equal to or higher than the predetermined threshold or the transfer rate of the corresponding logical volume is equal to or higher than the predetermined threshold are moved to the VM 116 when the number of worker nodes about which the disk IOPS is equal to or higher than the predetermined threshold or the transfer rate of the corresponding logical volume is equal to or higher than the predetermined threshold is smaller than the predetermined threshold "n" (FIG. 13, S1412: True, S1413).

(7) The scaling system 100 executes scale-in processing to cause the third worker node to operate as the second worker node in the first calculating apparatus and cause the second volume to communicate with the second worker node through the first network port. Therefore, the scale-in processing can be executed after the scale-out processing.

(8) Calculation resources of the first calculating apparatus are scaled up when the CPU usage of the first calculating apparatus exceeds a predetermined threshold and the disk IOPS of the first calculating apparatus is equal to or lower than the predetermined threshold. Therefore, in the calculation system S, the scale-up is possible according to need.

(9) The scaling system 100 includes the system monitoring result display program 313 that displays time-series change in the system performance of the scaling system 100 and the configuration of the scaling system 100 as illustrated in FIG. 16 and FIG. 17. Therefore, the state of the system can be presented to the user in an easy-to-understand manner.

Modification Example 1

In the above-described embodiment, the virtual machines in the public cloud 101 included in the scaling system 100 are only two, the database server 107 and the VM 116. However, three or more virtual machines may exist in the public cloud 101 included in the scaling system 100. Furthermore, since the maximum number that can be set is desirable as the number of worker nodes as described above, at most the same number of virtual machines as the worker nodes can be used according to increase in the amount of transfer.

Modification Example 2

In the above-described embodiment, the storage apparatus 104 may be placed in not the near cloud 102 but an on-premise environment. Furthermore, the calculation system S may include plural pieces of storage apparatus 104.

Modification Example 3

In the above-described embodiment, the scaling system 100 has the system configuration information 318, the system performance information 319, the system monitoring information 320, the scaling execution information 321, and the task execution information 322 as illustrated in FIG. 2 and FIG. 5 to FIG. 9. However, all pieces of information of the system configuration information 318, the system performance information 319, the system monitoring information 320, the scaling execution information 321, and the task execution information 322 are not necessary and it suffices that the scaling system 100 has information that allows execution of the processing explained in the embodiment.

Modification Example 4

In the above-described embodiment, the calculation system S implements a distributed relational database. However, the database implemented by the calculation system S is not limited to the relational database. Furthermore, the calculation system S may implement an element other than the database.

In the above-described embodiment and modification examples, the configurations of functional blocks are merely one example. Several functional configurations illustrated as separate functional blocks may be integrally configured and a configuration represented by one functional block diagram may be divided into two or more functions. Furthermore, a configuration may be employed in which part of functions that the respective functional blocks have is possessed by another functional block.

The above-described embodiment and modification examples may be combined with each other. Although the various embodiment and modification examples have been explained in the above description, the present invention is not limited to the contents of them. Other aspects that are conceivable in the range of technical ideas of the present invention are also included in the range of the present invention.

What is claimed is:

1. A scaling system for improving resource utilization and security in a hybrid cloud computing environment, the scaling system comprising:
a first base that includes a first calculating apparatus, and a first worker node and a second worker node operate within the first calculating apparatus;
a second base that includes storage apparatus connected to the first base by a network, wherein the storage apparatus includes a first network port, a second network port, a first volume accessed by the first worker node via the first network port, and a second volume accessed by the second worker node via the first network port,
wherein access to the second base is restricted to fewer users than the first base; and
a monitoring server that is communicatively coupled to the first base and the second base, wherein the monitoring server is configured to:
determine that a transfer rate of the first calculating apparatus or a transfer rate of the first network port exceeds a predetermined threshold when the first volume and the second volume are executing communication with the first calculating apparatus through the first network port, and
in response to determining that the transfer rate of the first calculating apparatus or the transfer rate of the first network port exceeds the predetermined threshold when the first volume and the second volume are executing communication with the first calculating apparatus through the first network port:
the first volume remains coupled to the first worker node via the first network port,
add a second calculating apparatus to the first base, move the second worker node to the second calculating apparatus, and
once the second worker node is moved, cause the second worker node to operate as a third worker node, and configure the second volume to couple with the third worker node via the second network port.

2. The scaling system according to claim 1, wherein the first calculating apparatus and the second calculating apparatus are virtual machines.

3. The scaling system according to claim 1, wherein the first base is a public cloud allowed to be used by a plurality of unspecified persons, and
the second base is a near cloud or an on premise environment allowed to be used by only specific persons.

4. The scaling system according to claim 1, wherein a maximum number of worker nodes allowed to be created are created in the first calculating apparatus, and
the storage apparatus has at least a same number of volumes as the worker nodes.

5. The scaling system according to claim 1, wherein each of the first worker node and the second worker node is a node that implements a distributed database.

6. The scaling system according to claim 4, wherein
on a condition that the first volume and the second volume are executing communication with the first calculating apparatus through the first network port and the transfer rate of the first calculating apparatus or the transfer rate of the first network port exceeds the predetermined threshold;
half of the worker nodes included in the first calculating apparatus are moved to the second calculating apparatus when a number of the worker nodes included in a disk input/output operation per second (IOPS) is equal to or larger than a predetermined threshold number of nodes, and
the worker nodes included in the disk IOPS are moved to the second calculating apparatus when the number of worker nodes included in the one disk IOPS is smaller than the predetermined number of nodes, and
the disk input/output operation per second (IOPS) is equal to or higher than a predetermined threshold or a transfer rate of a corresponding volume is equal to or higher than a predetermined threshold.

7. The scaling system according to claim 1, wherein the scaling system further executes scale-in processing to cause the third worker node to operate as the second worker node in the first calculating apparatus and cause the second volume to communicate with the second worker node through the first network port.

8. The scaling system according to claim 1, wherein calculation resources of the first calculating apparatus are scaled up when CPU usage of the first calculating apparatus exceeds a predetermined threshold and a disk input/output operation per second (IOPS) of the first calculating apparatus is equal to or lower than a predetermined threshold.

9. The scaling system according to claim 1, wherein the scaling system further includes a system monitoring result display section that displays time-series change in system performance of the scaling system and a configuration of the scaling system.

10. A calculation method executed by a computer included in a scaling system, for improving resource utilization and security in a hybrid cloud computing environment, is configured to range over a first base that includes a first calculating apparatus, and a first worker node and a second worker node operate within the first calculating apparatus and a second base that includes a storage apparatus connected to the first base by a network,
wherein the storage apparatus includes a first network port, a second network port, a first volume accessed by the first worker node via the first network port, and a second volume accessed by the second worker node via the first network port, and
wherein access to the second base is restricted to fewer users than the first base,
the calculation method comprising:
determining that a transfer rate of the first calculating apparatus or a transfer rate of the first network port exceeds a predetermined threshold when the first volume and the second volume are executing communication with the first calculating apparatus through the first network port, and
in response to determining that the transfer rate of the first calculating apparatus or the transfer rate of the first network port exceeds the predetermined threshold when the first volume and the second volume are executing communication with the first calculating apparatus through the first network port:

the first volume remains coupled to the first worker node via the first network port, adding a second calculating apparatus to the first base, moving the second worker node to the second calculating apparatus, and once the second worker node is moved, causing the second worker node to operate as a third worker node, and configuring the second volume communicates with the third worker node through the second network port.

\* \* \* \* \*